US012810778B2

(12) United States Patent
Sung et al.

(10) Patent No.: US 12,810,778 B2
(45) Date of Patent: Nov. 24, 2026

(54) DISPLAY DEVICE AND DRIVING METHOD THEREOF

(71) Applicant: Samsung Display Co., LTD., Yongin-si (KR)

(72) Inventors: Jeongmin Sung, Yongin-si (KR); Woo Chul Kim, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 19/057,019

(22) Filed: Feb. 19, 2025

(65) Prior Publication Data

US 2025/0391323 A1 Dec. 25, 2025

(30) Foreign Application Priority Data

Jun. 21, 2024 (KR) ........................ 10-2024-0080900
Aug. 12, 2024 (KR) ........................ 10-2024-0107488

(51) Int. Cl.
*G09G 3/32* (2016.01)
*G09G 3/3233* (2016.01)

(52) U.S. Cl.
CPC ............. *G09G 3/32* (2013.01); *G09G 3/3233* (2013.01); *G09G 2310/08* (2013.01); *G09G 2320/0247* (2013.01); *G09G 2320/064* (2013.01); *G09G 2330/021* (2013.01)

(58) Field of Classification Search
CPC .... G09G 3/32; G09G 3/3233; G09G 2310/08; G09G 2320/0247; G09G 2320/064; G09G 2330/021
See application file for complete search history.

(56) References Cited

U.S. PATENT DOCUMENTS

| | | | | |
|---|---|---|---|---|
| 10,796,632 B2 | 10/2020 | Sung et al. | | |
| 11,037,506 B2 | 6/2021 | Noh et al. | | |
| 11,776,472 B2 | 10/2023 | Song et al. | | |
| 2017/0116922 A1* | 4/2017 | Jung | .................... | G09G 3/3258 |
| 2020/0082768 A1* | 3/2020 | Oh | ........................ | G09G 3/3291 |
| 2020/0193915 A1* | 6/2020 | Noh | ...................... | G09G 3/3233 |

(Continued)

FOREIGN PATENT DOCUMENTS

| | | |
|---|---|---|
| KR | 1020210137762 A | 11/2021 |
| KR | 1020220021059 A | 2/2022 |

(Continued)

*Primary Examiner* — Ryan A Lubit
(74) *Attorney, Agent, or Firm* — CANTOR COLBURN LLP

(57) ABSTRACT

A display device includes: a display panel including pixels connected to light emission control lines; a light emission driver connected to the display panel through the light emission control lines; and a timing controller which controls the light emission driver to display an image in a first light emission cycle when the display panel is driven at a first luminance level, and to display an image in a second light emission cycle when the display panel is driven at a second luminance level. The timing controller controls the light emission driver to display an image in a third light emission cycle between the first and second light emission cycles during a transition period when a luminance level of the display panel is changed from the first luminance level to the second luminance level, and to display an image in the second light emission cycle after the transition period.

18 Claims, 13 Drawing Sheets

(56) References Cited

U.S. PATENT DOCUMENTS

| | | | | |
|---|---|---|---|---|
| 2021/0183290 | A1* | 6/2021 | Sato | G09G 3/20 |
| 2022/0036814 | A1* | 2/2022 | Hwang | G09G 3/3233 |
| 2022/0051620 | A1* | 2/2022 | Song | G09G 3/3233 |
| 2022/0199025 | A1* | 6/2022 | Hong | G09G 3/3258 |
| 2023/0075226 | A1* | 3/2023 | Lee | G09G 3/2096 |

FOREIGN PATENT DOCUMENTS

| | | | |
|---|---|---|---|
| KR | 102370340 | B1 | 3/2022 |
| KR | 102641891 | B1 | 3/2024 |

* cited by examiner

DISPLAY DEVICE AND DRIVING METHOD THEREOF

This application claims priority to Korean Patent Application No. 10-2024-0080900, filed on Jun. 21, 2024, and Korean Patent Application No. 10-2024-0107488, filed on Aug. 12, 2024, and all the benefits accruing therefrom under 35 U.S.C. § 119, the contents of which in their entireties are herein incorporated by reference.

BACKGROUND

(1) Field

The disclosure relates to a display device and a driving method thereof.

(2) Description of the Related Art

As information technology has developed, importance of a display device, which is a connection medium between a user and information, has been highlighted. Accordingly, various types of display device such as a liquid crystal display device, an organic light emitting display device, and the like are widely used in various fields.

SUMMARY

Recently, display devices may use a method of controlling the luminance level of a display panel by controlling the duty ratio of a light emission signal. In such display devices, flicker may be perceived by a user depending on the light emission signal frequency.

Embodiments of the disclosure provide a display device and a driving method thereof that may reduce flicker when a frequency of an emission signal is changed according to a change in a luminance level of a display panel.

An embodiment of the disclosure provides a display device including: a display panel including pixels connected to light emission control lines; a light emission driver connected to the display panel through the light emission control lines; and a timing controller which controls the light emission driver to display an image in a first light emission cycle when the display panel is driven at a first luminance level, and to display an image in a second light emission cycle when the display panel is driven at a second luminance level different from the first luminance level. In such an embodiment, the timing controller controls the light emission driver to display an image in a third light emission cycle between the first light emission cycle and the second light emission cycle during a transition period when a luminance level of the display panel is changed from the first luminance level to the second luminance level, and to display an image in the second light emission cycle after the transition period.

In an embodiment, the timing controller may include a light emission signal determination portion which receives a luminance control signal and determines a luminance level and a light emission cycle corresponding to the luminance control signal; and a control signal generation portion which generates a light emission control signal corresponding to the determined luminance level and light emission cycle.

In an embodiment, the timing controller may further include a storage portion storing a lookup table including information on a light emission cycle corresponding to each of a plurality of luminance levels, and the light emission signal determination portion may determine the luminance level and the light emission cycle based on the lookup table.

In an embodiment, the transition period may correspond to one frame period.

In an embodiment, the luminance level of the display panel may be maintained at the first luminance level during the transition period.

In an embodiment, the luminance level of the display panel may be changed to the second luminance level during the transition period.

In an embodiment, the luminance level of the display panel may be changed to a value between the first luminance level and the second luminance level during the transition period.

In an embodiment, the transition period may correspond to a plurality of frame periods.

In an embodiment, the second light emission cycle may be greater than the first light emission cycle, and a light emission cycle of each of the plurality of frame periods included in the transition period may gradually increase.

In an embodiment, the second luminance level may be lower than the first luminance level, and the luminance level of each of the plurality of frame periods included in the transition period may gradually decrease.

In an embodiment, the second light emission cycle may be less than the first light emission cycle, and a light emission cycle of each of the plurality of frame periods included in the transition period may gradually decrease.

In an embodiment, the second luminance level may be higher than the first luminance level, and the luminance level of each of the plurality of frame periods included in the transition period may gradually increase.

Another embodiment of the disclosure provides an operating method of a display device including: displaying an image on a display panel with a first luminance level based on a first light emission cycle corresponding thereto; determining to change a luminance of the display panel to a second luminance level; determining a second light emission cycle corresponding to the second luminance level; displaying an image on the display panel based on a third light emission cycle between the first light emission cycle and the second light emission cycle; and displaying an image on the display panel based on the second light emission cycle.

In an embodiment, the determining the second light emission cycle corresponding to the second luminance may include determining the second light emission cycle based on a lookup table.

In an embodiment, the displaying the image on the display panel based on the third light emission cycle between the first light emission cycle and the second light emission cycle may include displaying an image on the display panel with the first luminance level.

In an embodiment, the displaying the image on the display panel based on the third light emission cycle between the first light emission cycle and the second light emission cycle may include displaying an image on the display panel with the second luminance level.

In an embodiment, the displaying the image on the display panel based on the third light emission cycle between the first light emission cycle and the second light emission cycle may include displaying an image on the display panel with a third luminance level between the first luminance level and the second luminance level.

Another embodiment of the disclosure provides an electronic device including: a display panel including pixels connected to light emission control lines; a light emission driver connected to the display panel through the light emission control lines; and a controller which controls the light emission driver to display an image in a first light emission cycle when the display panel is driven at a first luminance level, and to display an image in a second light emission cycle when the display panel is driven at a second luminance level different from the first luminance level. In such an embodiment, the controller may control the light emission driver to display an image in a third light emission cycle between the first light emission cycle and the second light emission cycle during a transition period when a luminance level of the display panel is changed from the first luminance level to the second luminance level, and to display an image in the second light emission cycle after the transition period.

In an embodiment, the controller may include a light emission signal determination portion which receives a luminance control signal and determines a luminance level and a light emission cycle corresponding to the luminance control signal; and a control signal generation portion which generates a light emission control signal corresponding to the determined luminance level and the determined light emission cycle.

In an embodiment, the controller may further include a storage portion storing a lookup table including information on a light emission cycle corresponding to each of a plurality of luminance levels. In such an embodiment, the light emission signal determination portion may determine the luminance level and the light emission cycle based on the lookup table.

In the display device and the driving method thereof according to the embodiments of the disclosure, flicker may be substantially reduced when a frequency of a light emission signal is changed according to a change in the luminance level of the display panel.

However, the effects of the disclosure are not limited to the above-described effects, and may be variously extended without departing from the spirit and scope of the disclosure.

DETAILED DESCRIPTION

Figure 1:
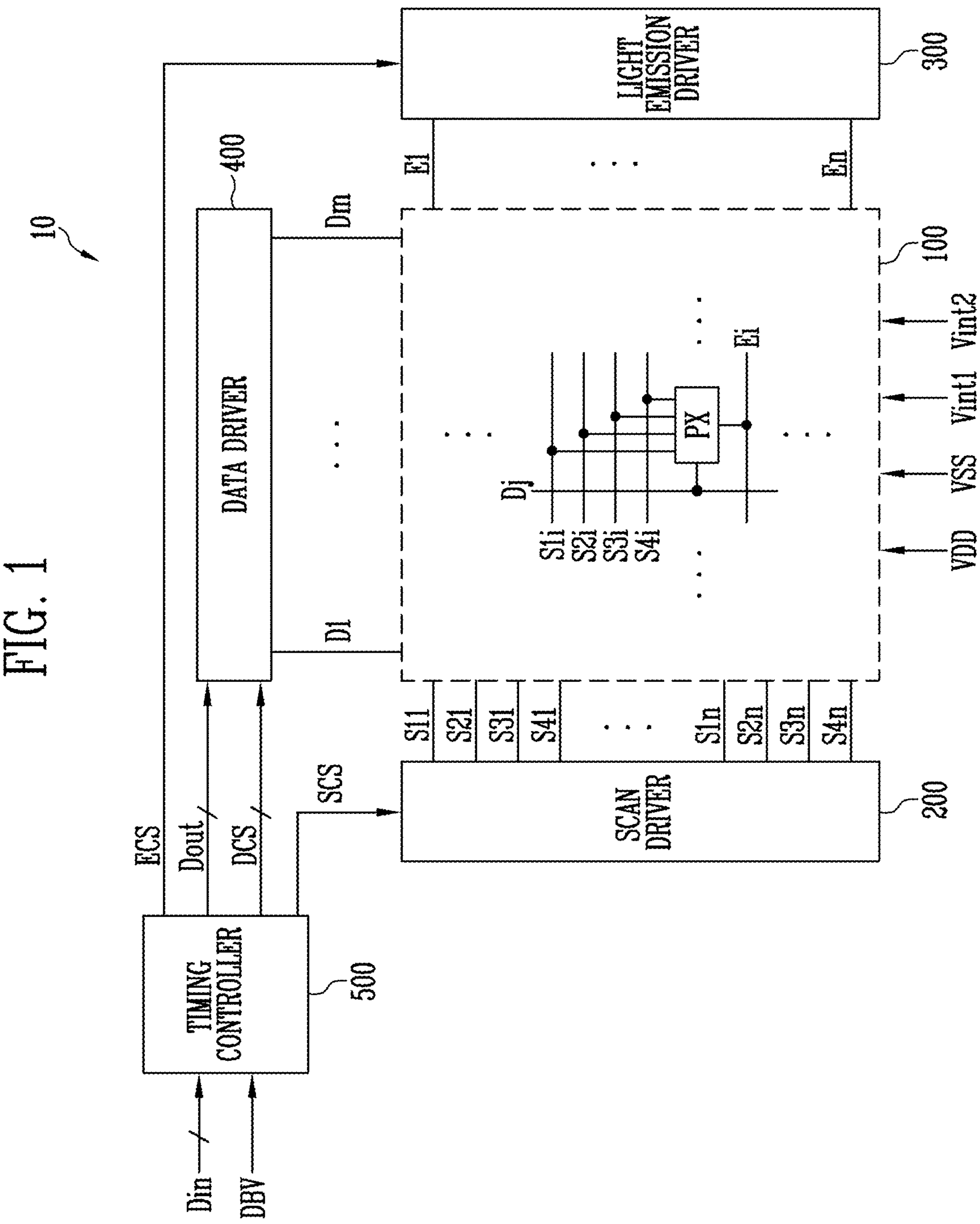
FIG. 1 illustrates a display device according to an embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art.

In order to clearly describe the disclosure, parts or portions that are irrelevant to the description are omitted, and identical or similar constituent elements throughout the specification are denoted by the same reference numerals. Therefore, the above-mentioned reference numerals may be used in other drawings.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. Thus, reference to "an" element in a claim followed by reference to "the" element is inclusive of one element and a plurality of the elements. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). In addition, the expression "same" in the description may mean "substantially the same." That is, it may be the same enough to convince those skilled in the art to be the same.

FIG. 1 illustrates a display device according to an embodiment of the disclosure.

Referring to FIG. 1, an embodiment of a display device 10 may include a pixel portion 100, a scan driver 200, a light emission driver 300, a data driver 400, and a timing controller 500.

The display device 10 may display an image at a luminance level according to a driving condition. In an embodiment, for example, when the display device 10 is driven outdoors, the amount of light around the display device 10 may be relatively large, and at this time, the display device 10 may increase the luminance level of the image displayed on the pixel portion 100 to improve image visibility. In such an embodiment, when the display device 10 is driven indoors where the amount of light round the display device 10 is relatively small, the display device 10 may decrease the luminance level of the image displayed on the pixel portion 100 to reduce power consumption.

In an embodiment, the duty ratio of the light emission signal supplied from the light emission driver 300 to light emission control lines E1 to En may be changed based on the luminance level of the display device 10. When the luminance level of the display device 10 is high, the duty ratio of the light emission signal supplied to the light emission control lines E1 to En may be relatively high, and when the luminance level of the display device 10 is low, the duty ratio of the light emission signal supplied to the light emission control lines E1 to En may be relatively low.

In an embodiment, the pixel portion 100 may include scan lines (S11 to Sin, S21 to S2*n*, S31 to S3*n*, and S41 to S4*n*), light emission control lines E1 to En, and data lines D1 to Dm, and may include pixels PX connected to the scan lines (S11 to S1*n*, S21 to S2*n*, S31 to S3*n*, and S41 to S4*n*), the light emission control lines E1 to En, and the data lines D1 to Dm. Here, m and n are integers greater than 1. Each of the pixels PX may include a driving transistor and a plurality of switching transistors. The pixel portion 100 may configure a display panel of the display device 10.

The timing controller 500 may receive input data Din, a luminance control signal DBV, and control signals from a host system such as an application processor (AP) through a predetermined interface. The timing controller 500 may control the driving timing of the scan driver 200, the light emission driver 300, and the data driver 400.

The timing controller 500 may generate a light emission portion control signal ECS based on the luminance control signal DBV. In an embodiment, the duty ratio of the light emission signal generated by the light emission driver 300 may be controlled based on the light emission portion control signal ECS. In another embodiment, the light emission period of the light emission signal generated by the light emission driver 300 may be controlled based on the light emission portion control signal ECS. This will be described in detail later.

The timing controller 500 may generate a scan control signal SCS, a data control signal DCS, and the light emission portion control signal ECS based on (e.g., by using) a first clock signal CLK1 or a second clock signal CLK2. In addition, the timing controller 500 may generate a horizontal synchronization signal and a vertical synchronization signal Vsync (see FIGS. 6 and 7) by dividing the first clock signal CLK1 or the second clock signal CLK2.

The scan control signal SCS may be supplied to the scan driver 200, the light emission portion control signal ECS may be supplied to the light emission driver 300, and the data control signal DCS may be supplied to the data driver 400. In addition, the timing controller 500 may correct (or rearrange) the input data Din to generate output data Dout, and may supply the output data Dout to the data driver 400.

The scan driver 200 may receive the scan control signal SCS from the timing controller 500, and may supply a first scan signal, a second scan signal, a third scan signal, a third scan signal, and a fourth scan signal to the first scan lines S11 to Sin, the second scan lines S21 to S2*n*, and the fourth scan lines S41 to S4*n*, respectively, based on the scan control signal SCS.

The first to fourth scan signals may be set as gate-on voltages corresponding to the type of transistor to which the corresponding scan signals are supplied. The transistor receiving the scan signal may be set to a turn-on state when the scan signal is supplied. In an embodiment, for example, the gate-on voltage of the scan signal supplied to the P-channel metal oxide semiconductor (PMOS) transistor may be at a logical low level, and the gate-on voltage of the scan signal supplied to the N-channel metal oxide semiconductor (NMOS) transistor may be at a logical high level. Hereinafter, the meaning of "the scan signal is supplied" may be understood that the scan signal is supplied at a logic level for turning on the transistor controlled by the scan signal.

The light emission driver 300 may receive the light emission portion control signal ECS from the timing controller 500 and supply the light emission control signal to the light emission control lines E1 to En based on the light emission portion control signal ECS. In an embodiment, for example, the light emission driver 300 may generate a light emission control signal using a light emission start signal included in the light emission portion control signal ECS. The light emission driver 300 may sequentially supply the light emission control signal to the light emission control lines E1 to En.

The light emission control signal may be set to a gate-off voltage (for example, a high voltage). The transistor receiving the emission control signal is turned off when the emission control signal is supplied, and may be set to a turn-on state in other cases. Hereinafter, the meaning of "the light emission control signal is supplied" may be understood as the light emission control signal being supplied at a logic level that turns off the transistor controlled by it. In FIG. 1, for better understanding and ease of description, each of the scan driver 200 and the emission driver 300 is shown as a single configuration, but the disclosure is not limited thereto. Depending on the design, the scan driver 200 may include a plurality of scan drivers, each of which supplies at least one selected from the first to fourth scan signals. In addition, at least one selected from the scan driver 200 and the light emission driver 300 may be integrated into a single driving circuit, module, or the like.

The data driver 400 may receive the data control signal DCS and the output data Dout from the timing controller 500. The data driver 400 may convert the digital output data Dout into an analog data signal (or a data voltage) in response to the control of the data control signal DCS. The data driver 400 may supply a data signal to the data lines D1 to Dm. I an embodiment, for example, the data driver 400 may supply a data signal to the data lines D1 to Dm in synchronization with the first scan signal supplied to the first scan lines Sin in S11.

In an embodiment, the display device 10 may further include a power supply (not shown). The power supply may supply the voltage of a first driving power VDD, the voltage of a second driving power VSS, the voltage of a first initialization power Vint1, and the voltage of a second initialization power Vint2 for driving the pixel PX to the pixel portion 100.

Figure 2:
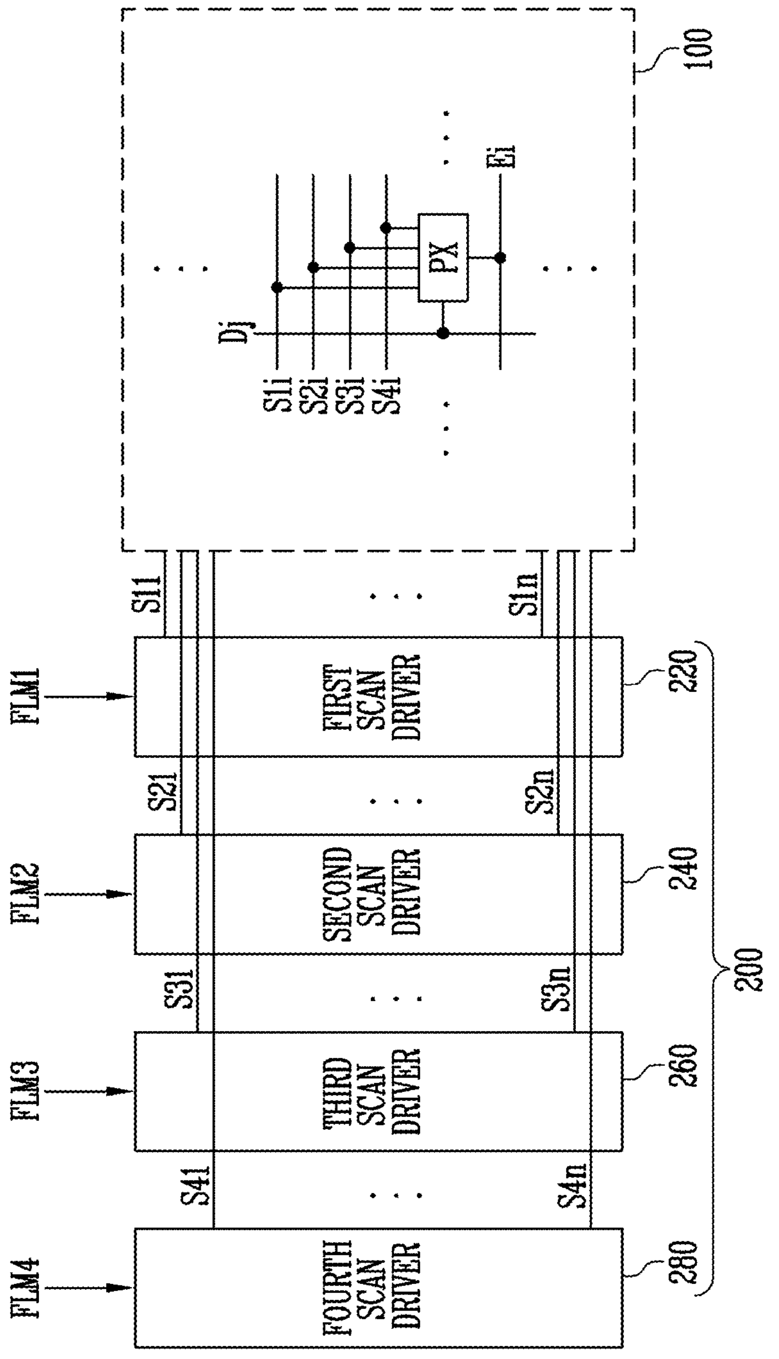
FIG. 2 illustrates an embodiment of a scan driver included in the display device of FIG. 1.

FIG. 2 illustrates an embodiment of a scan driver included in the display device of FIG. 1.

Referring to FIG. 2, in an embodiment, the scan driver 200 may include a first scan driver 220, a second scan driver 240, a third scan driver 260, and a fourth scan driver 280.

The scan control signal SCS may include first to fourth scan start signals FLM1 to FLM4. The first to fourth scan start signals FLM1 to FLM4 may be supplied to the first to fourth scan drivers 220 to 280, respectively. The width, supply timing, and the like of the first to fourth scan start signals FLM1 to FLM4 may be determined based on driving conditions and frame frequencies of the pixel PX.

The first scan driver 220 may sequentially supply the first scan signal to the first scan lines S11 to Sin in response to the first scan start signal FLM1. The second scan driver 240 may sequentially supply the second scan signal to the second scan lines S21 to S2*n* in response to the second scan start signal FLM2. The third scan driver 260 may sequentially supply the third scan signal to the third scan lines S31 to S3*n* in response to the third scan start signal FLM3. The fourth scan driver 280 may sequentially supply the fourth scan signal to the fourth scan lines S41 to S4*n* in response to the fourth scan start signal FLM4.

Figure 3:
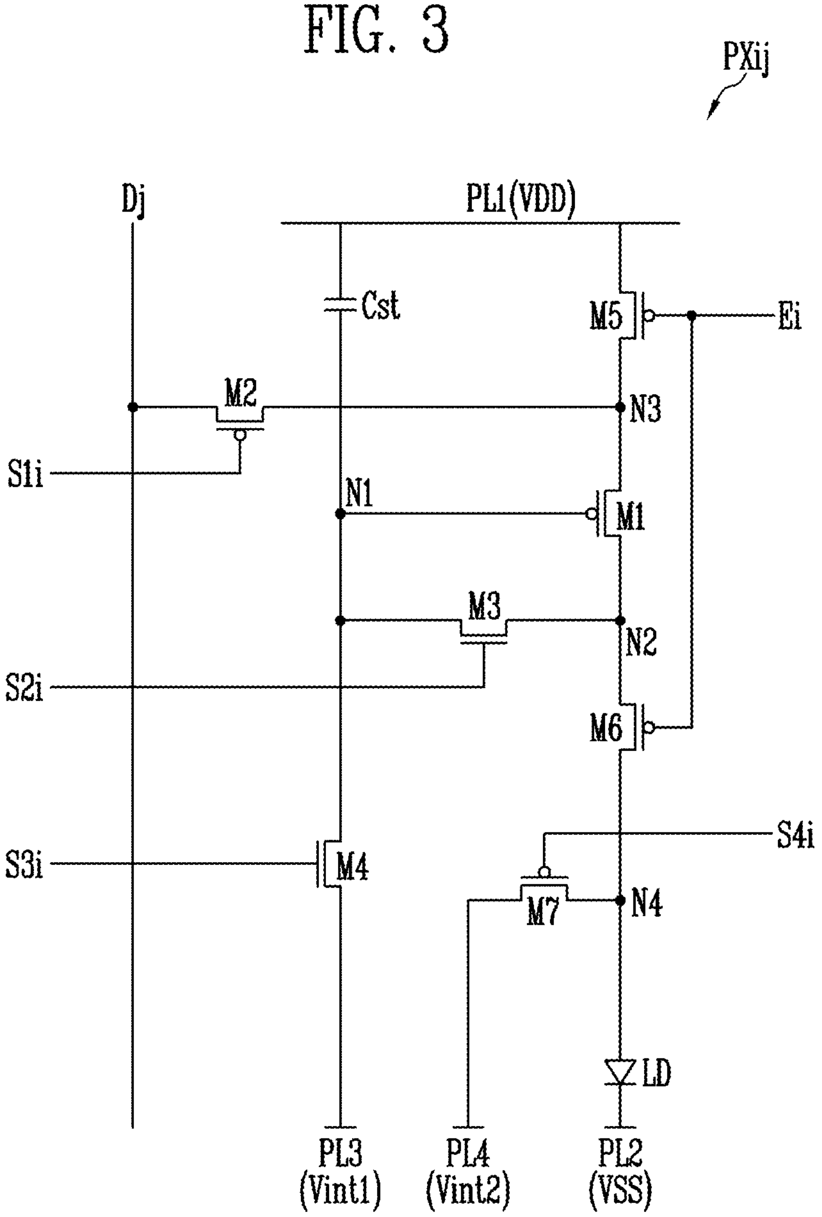
FIG. 3 illustrates an embodiment of a pixel included in the display device of FIG. 1.

FIG. 3 illustrates an embodiment of a pixel included in the display device of FIG. 1. In FIG. 3, for better comprehension and ease of description, a pixel PXij disposed at an i-th horizontal line (or an i-th pixel row) and connected to a j-th data line Dj is illustrated. Here, i and j are natural numbers.

Referring to FIG. 3, the pixel PXij according to an embodiment of the disclosure includes a light emitting element LD and a pixel circuit for controlling the amount of current supplied to the light emitting element LD.

A first electrode (or an anode electrode) of the light emitting element LD may be connected to a fourth node N4, and a second electrode (or a cathode electrode) of the light emitting element LD may be connected to a second power line PL2 to which the second driving power VSS is supplied. The light emitting element LD may generate light with a predetermined luminance corresponding to the amount of current supplied from a first transistor M1.

In an embodiment, the light emitting element LD may include an organic light emitting diode. In another embodiment, the light emitting element LD may include an inorganic light emitting diode such as a micro light emitting diode (LED) or a quantum dot light emitting diode. In another embodiment, the light emitting element LD may be an element in which an organic material and an inorganic material are complexly formed. In FIG. 3, an embodiment where the pixel PX includes a single light emitting element LD is shown, but not being limited thereto. In another embodiment, the pixel PX may include a plurality of light emitting elements, and the plurality of light emitting elements may be connected in series, in parallel, or in series and parallel to each other.

In an embodiment, as shown in FIG. 3, the pixel circuit may include first to seventh transistors M1 to M7 and a storage capacitor Cst.

A first electrode of the first transistor M1 (or driving transistor) may be connected to a third node N3, and a second electrode thereof may be connected to a second node N2. In addition, a gate electrode of the first transistor M1 may be connected to the first node N1. The first transistor M1 may control the amount of current supplied from the first driving power VDD to the second driving power VSS via the light emitting element LD in response to the voltage of the first node N1. To this end, the first driving power VDD may be set to a voltage higher than the second driving power VSS.

The second transistor M2 may be connected between the data line Dj and the third node N3. In addition, a gate electrode of the second transistor M2 may be connected to the first scan line S1*i*. The second transistor M2 may be turned on when the first scan signal is supplied to the first scan line S1*i* to electrically connect the data line Dj and the third node N3.

The third transistor M3 may be connected between the first node N1 and the second node N2. In addition, a gate electrode of the third transistor M3 may be connected to the second scan line S2*i*. The third transistor M3 may be turned on when the second scan signal is supplied to the second scan line S2*i* to electrically connect the first node N1 and the second node N2. When the third transistor M3 is turned on, the first transistor M1 is diode-connected.

The fourth transistor M4 is connected between the first node N1 and the third power line PL3 to which the first initialization power Vint1 is supplied. In addition, a gate electrode of the fourth transistor M4 is connected to the third scanning line S3*i*. The fourth transistor M4 may be turned on when the third scan signal is supplied to the third scan line S3*i* to supply the voltage of the first initialization power source Vint1 to the first node N1. Here, the voltage of the first initialization power source Vint1 may be set to a voltage lower than the data signal supplied to the data line Dj.

The fifth transistor M5 is connected between the first power line PL1 to which the first driving power VDD is supplied and the third node N3. In addition, a gate electrode of the fifth transistor M5 may be connected to the light emission control line Ei. The fifth transistor M5 may be turned off when an emission control signal is supplied to the emission control line Ei, and may be turned on in other cases.

The sixth transistor M6 is connected between the second node N2 and the fourth node N4. In addition, a gate electrode of the sixth transistor M6 may be connected to the light emission control line Ei. The sixth transistor M6 may be turned off when an emission control signal is supplied to the emission control line Ei, and may be turned on in other cases. In an embodiment, as shown in FIG. 3, the fifth transistor M5 and the sixth transistor M6 may be connected to a same light emission control line Ei, but the disclosure is not limited thereto. In another embodiment, the fifth transistor M5 and the sixth transistor M6 may be connected to different light emission control lines, respectively.

The seventh transistor M7 is connected between the fourth node N4 and the fourth power line PL4 to which the second initialization power Vint2 is supplied. In addition, a gate electrode of the seventh transistor M7 may be connected to the fourth scan line S4*i*. The seventh transistor M7 may be turned on when the fourth scan signal is supplied to the fourth scan line S4*i* to supply the voltage of the second initialization power Vint2 to the fourth node N4.

When the voltage of the second initialization power Vint2 is supplied to the fourth node N4, the parasitic capacitor of the light emitting element LD may be discharged. As the residual voltage charged in the parasitic capacitor of the light emitting element LD is discharged (or removed), unintended micro light emission may be effectively prevented. Accordingly, the black expression ability of the pixel PXij may be improved.

In an embodiment, the first initialization power Vint1 and the second initialization power Vint2 may be set to different voltages. That is, a voltage for initializing the first node N1 and a voltage for initializing the fourth node N4 may be set to be different from each other. However, this is merely an example, and the voltage of the first initialization power Vint1 may be substantially the same as the voltage of the second initialization power Vint2.

The storage capacitor Cst is connected between the first power line PL1 and the first node N1. The storage capacitor Cst may store the voltage applied to the first node N1.

In an embodiment, the first transistor M1, the second transistor M2, the fifth transistor M5, the sixth transistor M6, and the seventh transistor M7 may be formed as polysilicon semiconductor transistors. In an embodiment, for example, the first transistor M1, the second transistor M2, the fifth transistor M5, the sixth transistor M6, and the seventh transistor M7 may include a poly-silicon semiconductor layer formed through a low temperature poly-silicon (LTPS) process as an active layer (channel). In addition, the first transistor M1, the second transistor M2, the fifth transistor M5, the sixth transistor M6, and the seventh transistor M7 may be P-type transistors (for example, P-channel metal-oxide-semiconductor (PMOS) transistors). Accordingly, the gate-on voltage for turning on the first transistor M1, the second transistor M2, the fifth transistor M5, the sixth transistor M6, and the seventh transistor M7 may be at a logic low level.

Since the poly-silicon semiconductor transistor has characteristics of a fast response speed, it may be applied to a switching element desired to have characteristics of fast switching.

In an embodiment, the third transistor M3 and the fourth transistor M4 may be formed as oxide semiconductor transistors. In an embodiment, for example, the third transistor M3 and the fourth transistor M4 may be N-type oxide semiconductor transistors (for example, N-channel metal-oxide-semiconductor (NMOS) transistors) and may include an oxide semiconductor layer as an active layer. Accordingly, the gate-on voltage for turning on the third transistor M3 and the fourth transistor M4 may be at a logic high level.

The oxide semiconductor transistor may be processed at a low temperature, and has lower charge mobility than that of the poly-silicon semiconductor transistor. That is, the oxide semiconductor transistor has an excellent off-current characteristic. Accordingly, when the third transistor M3 and the fourth transistor M4 are formed as oxide semiconductor transistors, the leakage current from the first node N1 due to low-frequency driving may be minimized, thereby improving the display quality.

Figure 4A:
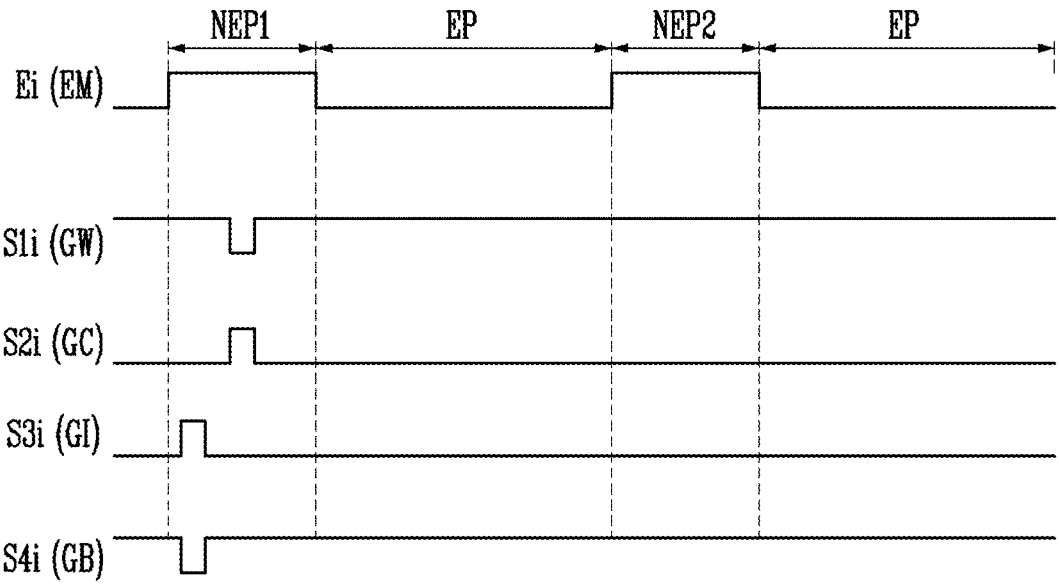
FIG. 4A and FIG. 4B illustrate embodiments of signals supplied to a pixel in one frame period of FIG. 3.
Figure 4B:
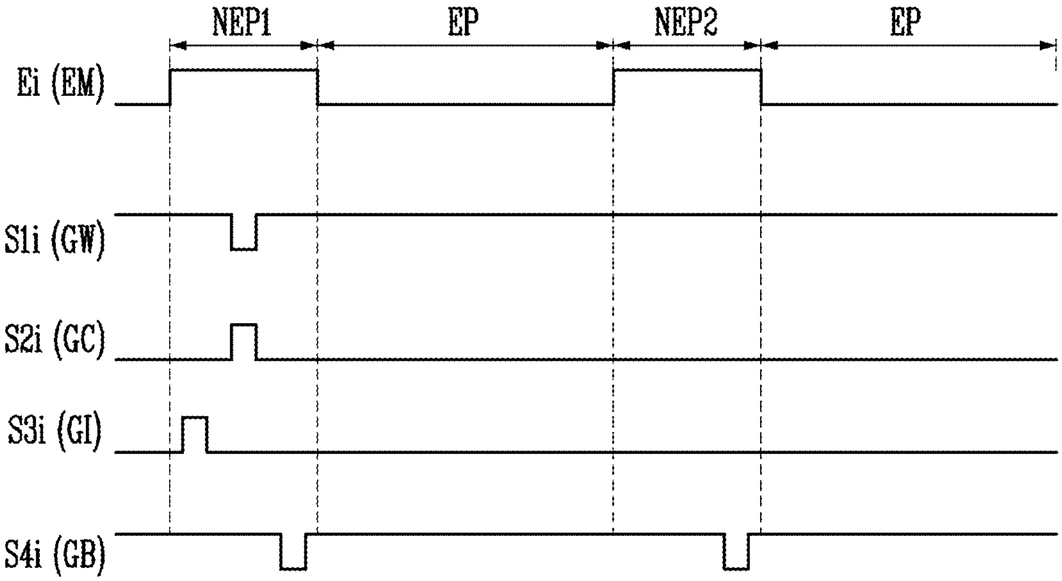

FIG. 4A and FIG. 4B illustrate embodiments of signals supplied to a pixel in one frame period of FIG. 3.

Referring to FIG. 4A, in an embodiment, one frame period may include a light emission period EP, a first non-light emission period NEP1, and a second non-light emission period NEP2. The emission period EP may be adjacent to each of the first and second non-emission periods NEP1 and NEP2.

Although FIG. 4A illustrates an embodiment where two non-emission periods NEP1 and NEP2 are included in one frame period, the disclosure is not limited thereto. In an embodiment, for example, the number of non-emission periods NEP1 and NEP2 included in one frame period may be variously set depending on the frame frequency and/or settings of the display device 10.

The first non-emission period NEP1 may mean a period during which a data signal is written. The second non-emission period NEP2 may mean a period in which the previous data signal is maintained and the pixel PXij is not emitting light. When a plurality of non-emission periods are included in one frame period as described above, motion blur or the like is reduced, and accordingly, video image quality may be improved.

The emission control signal EM may be supplied multiple times during one frame period. That is, the emission control signal EM may have an off period corresponding to the first non-emission period NEP1 and the second non-emission period NEP2. Here, the off period of the emission control signal may mean a period in which the emission control signal is supplied and thus the fifth transistor M5 and the sixth transistor M6 are turned off. The off period may be divided into a first off period corresponding to the first non-emission period NEP1 and a second off period corresponding to the second non-emission period NEP2.

In an embodiment, first, the fifth transistor M5 and the sixth transistor M6 are turned off by the emission control signal EM supplied to the emission control line Ei during the first non-emission period NEP1. When the fifth transistor M5 and the sixth transistor M6 are turned off, the electrical connection between the first power line PL1 and the light emitting element LD is blocked, and accordingly, the light emitting element LD is set to a non-emission state.

Thereafter, the third scan signal GI is supplied to the third scan line S3*i*, and the fourth scan signal GB is supplied to the fourth scan line S4*i*. When the third scan signal GI is supplied to the third scan line S3*i*, the fourth transistor M4 is turned on, and when the fourth scan signal GB is supplied to the fourth scan line S4*i*, the seventh transistor M7 is turned on.

When the fourth transistor M4 is turned on, the voltage of the first initialization power Vint1 is supplied to the first node N1, and accordingly, the first node N1 is initialized by the voltage of the first initialization power Vint1. When the seventh transistor M7 is turned on, the voltage of the second initialization power Vint2 is supplied to the fourth node N4, and accordingly, the anode electrode of the light emitting element LD is initialized by the voltage of the second initialization power Vint2. Here, the fourth scan signal GB supplied to the fourth scan line S4*i* may be set as the first scan signal supplied to the first scan line S1*i*-1 disposed in the previous horizontal line.

Thereafter, the first scan signal GW is supplied to the first scan line S1*i*, and the second scan signal GC is supplied to the second scan line S2*i*. When the first scan signal GW is supplied to the first scan line S1*i*, the second transistor M2 is turned on. When the second scan signal GC is supplied to the second scan line S2*i*, the third transistor M3 is turned on.

When the second transistor M2 is turned on, the data line Dj and the third node N3 are electrically connected to each other, and accordingly, a data signal is supplied from the data line Dj to the third node N3. When the third transistor M3 is turned on, the first transistor M1 is diode-connected. In this case, the data signal supplied to the third node N3 is supplied to the first node N1 via the first transistor M1 diode-connected. Accordingly, a voltage corresponding to the data signal and the threshold voltage of the first transistor M1 may be applied to the first node N1. The storage capacitor Cst stores the voltage applied to the first node N1.

After the voltage corresponding to the data signal and the threshold voltage of the first transistor M1 are stored in the storage capacitor Cst, the supply of the emission control signal EM is stopped. When the supply of the light emission control signal EM is stopped, the fifth transistor M5 and the sixth transistor M6 are turned on. When the fifth transistor M5 and the sixth transistor M6 are turned on, the first power line PL1 may be electrically connected to the anode electrode of the light emitting element LD via the fifth transistor M5, the first transistor M1, and the sixth transistor M6. In this case, the first transistor M1 supplies a driving current corresponding to the voltage applied to the first node N1 to the light emitting element LD, and the light emitting element LD emits light with a luminance corresponding to the driving current. That is, the light emitting element LD may emit light with a luminance corresponding to the driving current during the light emission period EP after the first non-light emission period NEP1.

During the second non-emission period NEP2, the emission control signal EM is supplied to the emission control line Ei, and accordingly, the fifth transistor M5 and the sixth transistor M6 are turned off. When the fifth transistor M5 and the sixth transistor M6 are turned off, the electrical connection between the first power line PL1 and the light emitting element LD is blocked, and accordingly, the light emitting element LD is set to a non-emission state.

In an embodiment, as shown in FIG. 4A, the scan signals GW, GC, GI, and GB are not supplied during the second non-emission period NEP2. Accordingly, the storage capacitor Cst maintains the voltage stored during the first non-emission period NEP1. During the emission period EP following the second non-emission period NEP2, the supply of the emission control signal EM is stopped, so that the fifth transistor M5 and the sixth transistor M6 are turned on. Then, during the emission period EP following the second non-emission period NEP2, the light emitting element LD may emit light with a luminance corresponding to the driving current.

In an embodiment of the disclosure, the supply waveform of the scan signal for driving the pixel PXij may be variously changed. In an embodiment, for example, as shown in FIG. 4B, after the first scan signal GW is supplied to the first scan line S1*i* during the first non-emission period NEP1, the fourth scan signal GB may be supplied to the fourth scan line S4*i*. In addition, the fourth scan signal GB may be supplied to the fourth scan line S4*i* during the second non-emission period NEP2.

When the fourth scan signal GB is supplied to the fourth scan line S4*i* during the second non-emission period NEP2, the seventh transistor M7 is turned on, and accordingly, the anode electrode of the light emitting element LD may be initialized by the voltage of the second initialization power Vint2. When the voltage of the second initialization power Vint2 is supplied to the anode electrode of the light emitting element LD during the second non-emission period NEP2, an increase in luminance of the light emitting element LD may be prevented.

Figure 5:
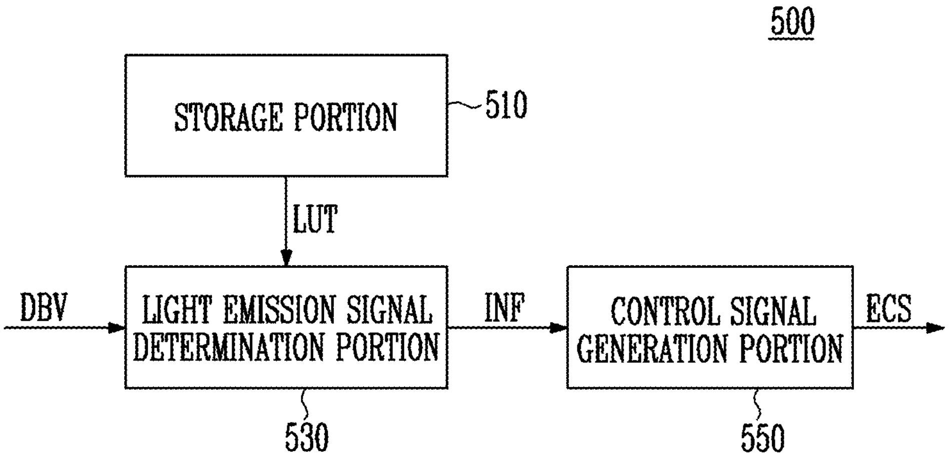
FIG. 5 illustrates a block diagram of a timing controller according to an embodiment of the disclosure.

FIG. 5 illustrates a block diagram of a timing controller according to an embodiment of the disclosure.

Referring to FIG. 5, a timing controller 500 may include a storage portion 510, a light emission signal determination portion 530, and a control signal generation portion 550. In an embodiment, the timing controller 500 may be defined by a circuitry, and portions thereof may be defined by portions of the circuitry corresponding thereto. The storage portion 510 may store a lookup table LUT for setting a duty ratio and an emission cycle of the emission control signal according to a luminance level. The lookup table LUT may include information on a light emission cycle corresponding to each of a plurality of luminance levels. In an embodiment, for example, the storage portion 510 may store a lookup table in the form of Table 1 below.

TABLE 1

| Luminance level | Duty ratio | Light emission cycle |
|---|---|---|
| L1 | D1 | C1 |
| L2 | D2 | C2 |
| L3 | D3 | C3 |
| L4 | D4 | C4 |
| L5 | D5 | C5 |
| L6 | D6 | C6 |

Referring to Table 1, the display device may operate at one of six luminance levels. In Table 1, each of D1 to D6 may be a number greater than 0 and less than 1. In addition, each of C1 to C6 in Table 1 may be a natural number greater than or equal to 1.

Each luminance level has a corresponding duty ratio and light emission cycle. In an embodiment, for example, when the luminance control signal DBV includes information indicating the luminance level of L4, the display device 10 may operate based on the light emission duty ratio of D4 and the light emission cycle of C4. As the luminance level increases, the light emission duty ratio may also increase.

The light emission duty ratio and the light emission cycle will be described with reference to FIG. 8, FIG. 9A, and FIG. 9B.

According to an embodiment, the display device may operate at one of various luminance levels exceeding six. In such an embodiment, a lookup table may be determined to set a duty ratio and a light emission cycle for each luminance level section of various ranges. In an embodiment, for example, the storage portion 510 may store a lookup table in the form of Table 2 below.

TABLE 2

| Luminance level (L) | Duty ratio | Light emission cycle |
|---|---|---|
| L < L1 | k1 · L | Ca |
| L1 ≤ L < L2 | k2 · L | Cb |
| L2 ≤ L < L3 | k3 · L | Cc |
| L3 ≤ L < L4 | k4 · L | Cd |
| L4 ≤ L < L5 | k5 · L | Ce |
| L ≥ L5 | k6 · L | Cf |

Referring to Table 2, the display device may divide various luminance levels into six sections. A duty ratio and a light emission cycle may be determined according to a section to which the luminance level belongs. In Table 2, the duty ratios "k1·L" to "k6·L" may be numbers greater than 0 and less than 1. In addition, each of Ca to Ce in Table 2 may be a natural number greater than or equal to 1.

In an embodiment, the coefficients k1 to k6 may be a same number. In another embodiment, at least two of coefficients k1 to k6 can be different numbers.

In an embodiment, for example, when the luminance level L specified by the luminance control signal DBV is greater than or equal to L4 and less than L5, the display device 10 may operate based on the emission duty ratio of "k5·L" and the emission cycle of Ce.

In an embodiment, the light emission signal determination portion 530 may receive the luminance control signal DBV and determine a duty ratio and an emission cycle of the emission control signal for realizing a target luminance level corresponding to the luminance control signal DBV. To this end, the light emission signal determination portion 530 may refer to a lookup table LUT stored in the storage portion 510. In an embodiment, the light emission signal determination portion 530 may transmit information INF on the determined duty ratio and light emission cycle to the control signal generation portion 550.

In an embodiment, for example, when the storage portion 510 stores a lookup table as shown in Table 1 and the luminance specified by the luminance control signal DBV is L2, the light emission signal determination portion 530 may refer to the lookup table to determine D2 as the light emission duty ratio and C2 as the light emission cycle. The light emission signal determination portion 530 may transmit the information INF on the light emission duty ratio D2 and the light emission cycle C2 to the control signal generation portion 550.

In another embodiment, for example, when the storage portion 510 stores a lookup table as shown in Table 2 and the luminance specified by the luminance control signal DBV is greater than or equal to L2 and less than L3, the light emission signal determination portion 530 may determine "k5·L" as the light emission duty ratio and Ce as the light emission cycle by referring to the lookup table. The light emission signal determination portion 530 may transmit the information INF on the light emission duty ratio "k5·L" and the light emission cycle Ce to the control signal generation portion 550.

The control signal generation portion 550 may generate the light emission portion control signal ECS based on the received information INF. The control signal generation portion 550 may generate a light emission portion control signal ECS for controlling the light emission driver 300 to generate a light emission control signal EM corresponding to the received information INF. In response to the light emission portion control signal ECS, the light emission driver 300 may generate a light emission control signal EM corresponding to the determined light emission duty ratio and light emission cycle.

Figure 6:
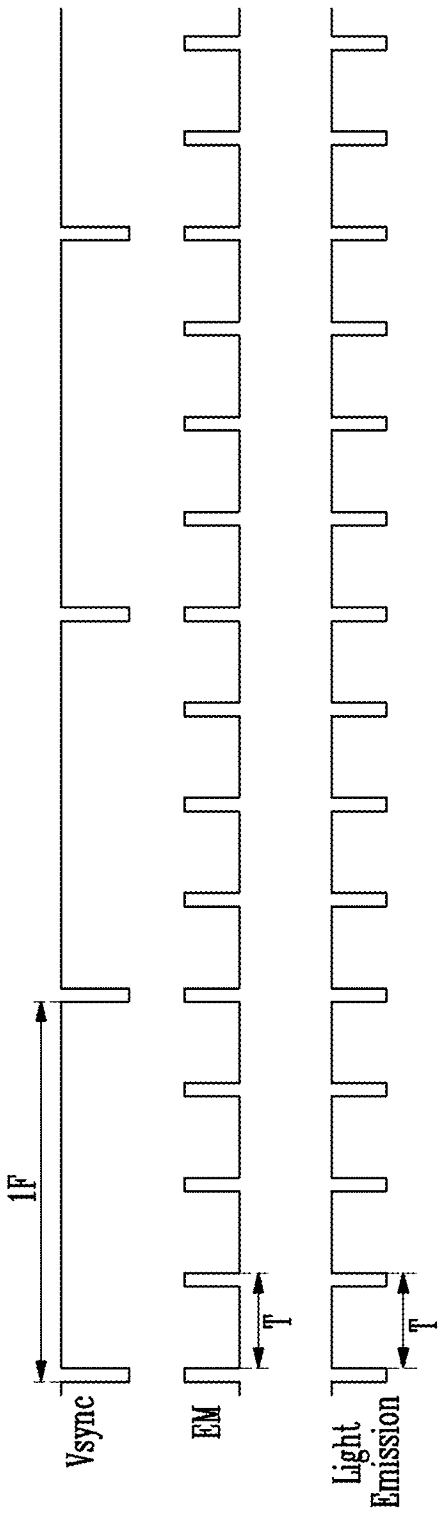
FIG. 6 illustrates a timing diagram of an operation of a display device according to a first luminance level.
Figure 7:
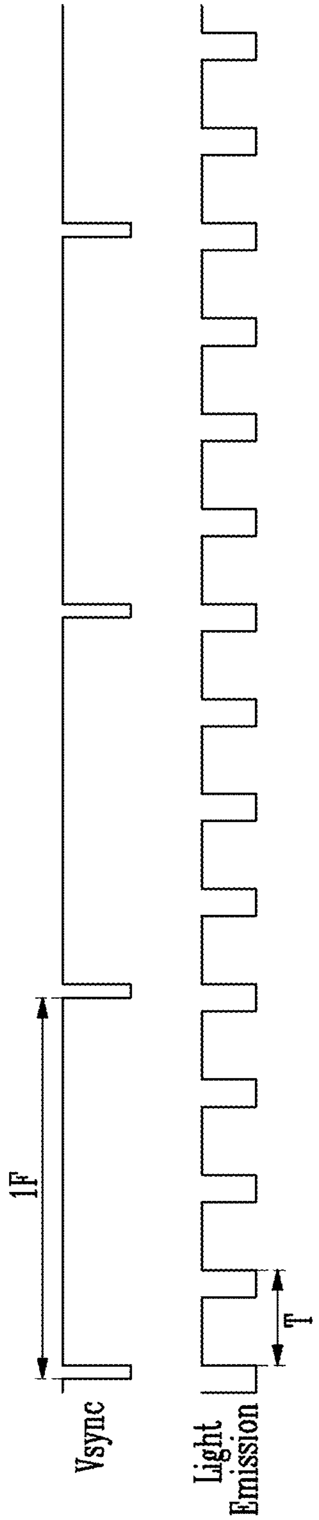
FIG. 7 illustrates a timing diagram of an operation of a display device according to a second luminance level.

FIG. 6 illustrates a timing diagram of an operation of a display device according to a first luminance level. FIG. 7 illustrates a timing diagram of an operation of a display device according to a second luminance level. FIG. 8 is a diagram for describing a luminance level and a light emission duty ratio of a display panel. Hereinafter, an operation of a display device will be described with reference to FIG. 6 to FIG. 8 together.

Referring to FIG. 6 and FIG. 7 together, a timing diagram of a vertical synchronization signal Vsync and an emission control signal EM, and a timing diagram of an emission pattern of a display panel within a pixel corresponding thereto are illustrated.

Referring to FIG. 6, one frame may start as the vertical synchronization signal Vsync toggles. That is, the interval between the toggling time points of the vertical synchronization signal Vsync may define one frame period 1F. Referring to FIG. 2, when the emission control signal EM is a high voltage, the light emitting element LD of each pixel included in the display panel does not emit light, and when the emission control signal EM is a low voltage, the light emitting element LD may emit light. Accordingly, in FIG. 6, the light emission pattern of the display panel is shown as having a phase opposite to that of the light emission control signal EM, and the illustration of the light emission control signal EM is omitted in FIG. 7 and subsequent drawings.

In FIG. 6 and FIG. 7, the emission control signal EM toggles to a low voltage four times with a period T during one frame period 1F. Accordingly, the light emission pattern of the display panel will also toggle 4 times with the period T.

In FIG. 6, the display device 10 operates based on the first luminance level, and in FIG. 7, the display device 10 operates based on the first luminance level. A duty ratio, which is a ratio of a period in which the display panel emits light during one period T of the light emission pattern, may be determined by each luminance level.

Figure 8:
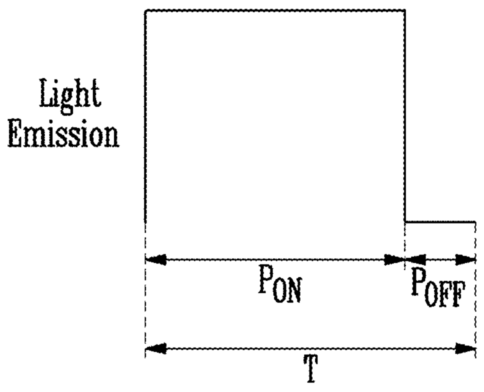
FIG. 8 is a diagram for describing a luminance level and a light emission duty ratio of a display panel.

Referring to FIG. 8, the light emission pattern of the display panel during the period T of the light emission pattern is illustrated. The display panel will generate light during the on-duty period $P_{ON}$ during the period T of the light emission pattern, and the display panel will not generate light during the off-duty period $P_{OFF}$ thereof. In FIG. 8, the light emission duty ratio may be defined as "$P_{ON}/T$".

Referring to FIG. 6 and FIG. 7 together, it may be seen that the light emission duty ratio of the display panel of FIG. 6 is higher than the light emission duty ratio of the display panel of FIG. 7. The time for which the display panel maintains the light emission state for one period T1 of the light emission pattern in FIG. 6 is longer than the time for which the display panel maintains the light emission state for one period T1 of the light emission pattern in FIG. 7. Accordingly, the amount of light generated by the display panel operating as shown in FIG. 6 for a certain period of time is greater than the amount of light generated by the display panel operating as shown in FIG. 7 for a certain period of time. In this way, the luminance level may be controlled by controlling the on-duty ratio (that is, duty ratio) to light generated by the display panel during the period T. In an embodiment, by controlling the duty ratio of the light emission control signal EM, the duty ratio of light generated by the display panel may be controlled.

Figure 9A:
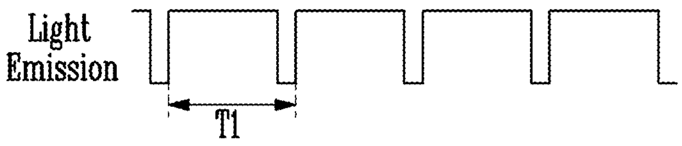
FIG. 9A and FIG. 9B are drawings for explaining a first light emission period and a second light emission period of a display panel for indicating a first luminance level, respectively.
Figure 9B:
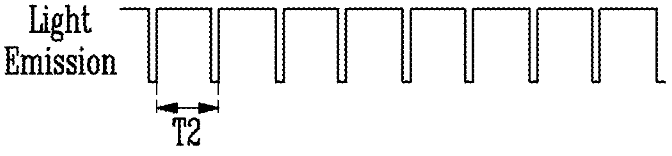

FIG. 9A and FIG. 9B are drawings for explaining a first light emission period and a second light emission period of a display panel for indicating a first luminance level, respectively. FIG. 9A and FIG. 9B respectively illustrate a light emission pattern corresponding to the first light emission period T1 and a light emission pattern corresponding to the second light emission period T2 during the first frame period 1F. Referring to FIG. 9A and FIG. 9B together, the first light emission period T1 may have a period twice longer than that of the second light emission period T2. Accordingly, in FIG. 9A, the light emission pattern includes 4 light emission cycles during one frame period 1F, and in FIG. 9B, the light emission pattern includes 8 light emission cycles during one frame period 1F. The light emission pattern of FIG. 9A has twice the light emission period and half the light emission cycle compared to the light emission pattern of FIG. 9B. However, when the duty ratio is the same within each light emission period, the luminance of light generated by the display panel for a certain period of time will be the same in the cases of FIG. 9A and FIG. 9B.

Figure 10:
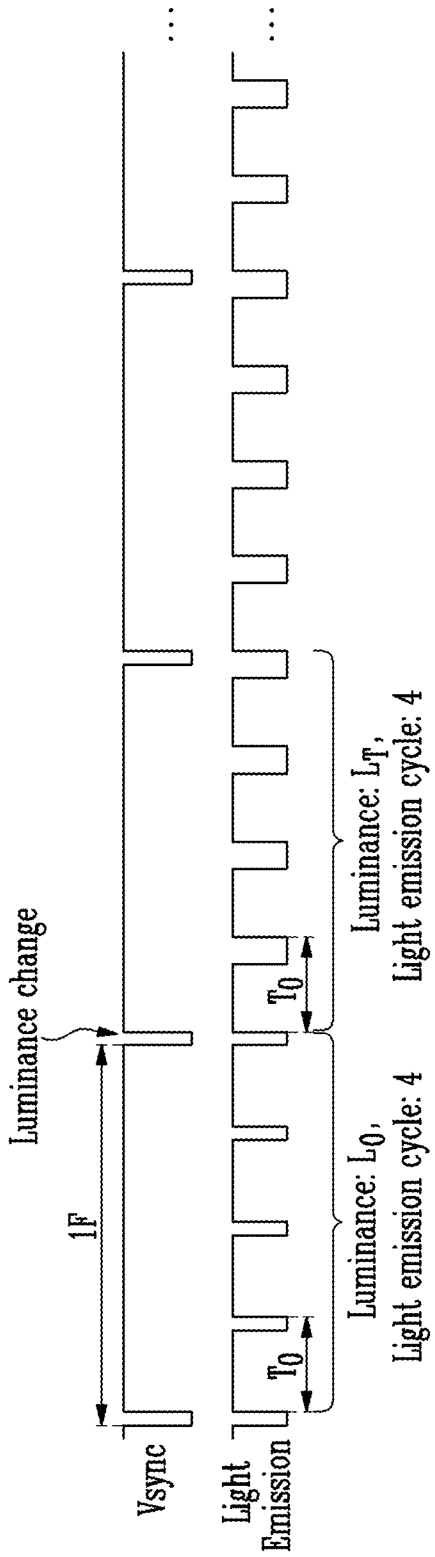
FIG. 10 illustrates a timing diagram of an operation of a display device for changing a luminance level according to an embodiment of the disclosure.

FIG. 10 illustrates a timing diagram of an operation of a display device for changing a luminance level according to an embodiment of the disclosure.

Referring to FIG. 10, during a first frame period 1F, the display device 10 operates to correspond to the initial luminance level $L_0$. That is, the light emission duty ratio of the display panel during the first frame period 1F may be a value corresponding to the initial luminance level $L_0$. In addition, the light emission pattern of the display panel during the first frame period 1F may include four light emission cycles with the initial period $T_0$.

Immediately after the first frame period 1F, the luminance level of the display device 10 may be changed. As described above, the luminance level of the display device 10 may be changed to the target luminance level $L_T$ in response to the luminance control signal DBV transmitted to the timing controller 500 of the display device 10. In FIG. 10, the luminance level is changed from the initial luminance level $L_0$ to the target luminance level $L_T$, and the period of the light emission pattern is maintained at the initial period $T_0$. Accordingly, the number of light emission cycles may also be maintained at 4.

When the frequency of the light emission cycle is low at a specific luminance, flickering of the image displayed by the display device 10 may be recognized. That is, as shown in FIG. 10, when a relatively low light emission cycle of 4 is maintained even though the luminance level of the display device changes to a low level, flickering of the image may be continuously recognized from the time of the luminance change.

To solve this problem, according to the display device according to another embodiment of the disclosure, a light emission cycle of an appropriate value for each luminance level may be preset. That is, as described above with reference to Table 1 and Table 2, when the luminance level of the display device 10 is changed, an appropriate light emission cycle corresponding thereto may be set by the lookup table. Hereinafter, an operation of a display device for changing a luminance level will be described with reference to FIG. 11.

Figure 11:
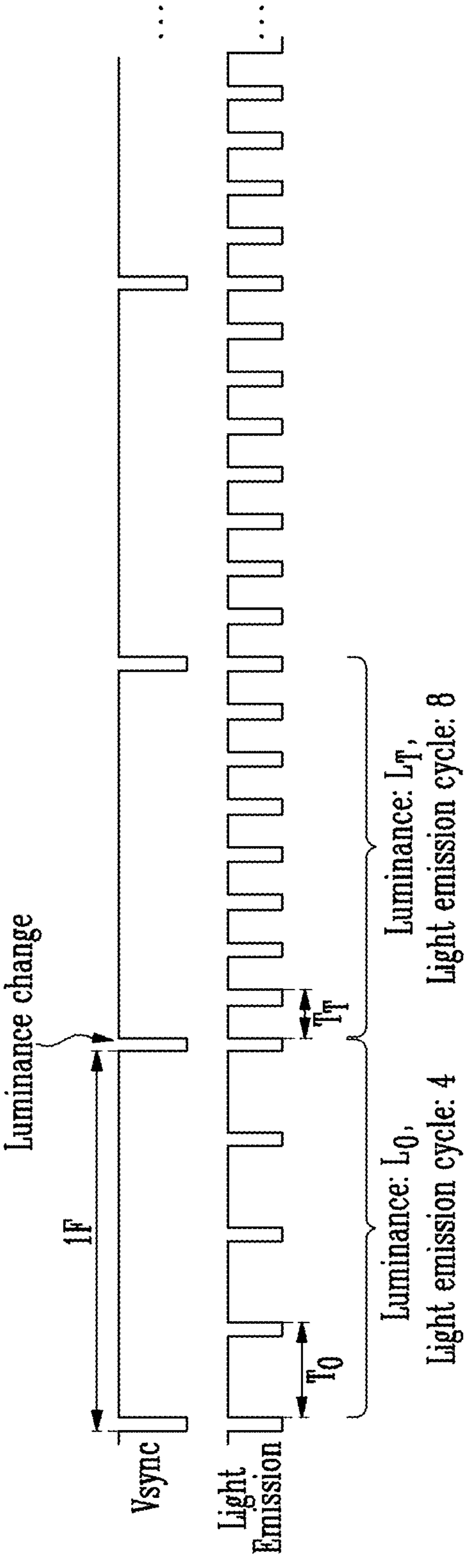
FIG. 11 illustrates a timing diagram of an operation of a display device for changing a luminance level according to another embodiment of the disclosure.

FIG. 11 illustrates a timing diagram of an operation of a display device for changing a luminance level according to another embodiment of the disclosure.

Referring to FIG. 11, during the first frame period 1F, the display device 10 operates to correspond to the initial luminance level $L_0$. That is, the light emission duty ratio of the display panel during the first frame period 1F may be a value corresponding to the initial luminance level $L_0$. In addition, the light emission pattern of the display panel during the first frame period 1F may include four light emission cycles according to the initial period $T_0$.

Immediately after the first frame period 1F, the luminance level of the display device 10 may be changed. As described above, the luminance level of the display device 10 may be changed to the target luminance level $L_T$ in response to the luminance control signal DBV transmitted to the timing controller 500 of the display device 10. In addition, in FIG. 11, the luminance level is changed from the initial luminance level $L_0$ to the target luminance level $L_T$, and the light emission cycle is also changed. The changed light emission cycle may be determined in a same manner as described above with reference to Table 1 and Table 2. In an embodiment, as shown in FIG. 11, the number of changed light emission cycles may be 8. As the number of light emission cycles is changed, the period of the light emission pattern is also changed to the target period $T_T$.

Referring to FIG. 11, as the luminance level is lowered, the light emission cycle is also changed to a value corresponding to the lowered luminance level not to cause flickering. Accordingly, flickering of the image may not occur after the point in time when the luminance is changed.

However, at the point in time when the luminance is changed, momentary flickering may occur as the light emission cycle is rapidly changed. Referring to FIG. 11, since the emission cycle of the emission pattern is 4 just before the luminance is changed, while the emission cycle of the emission pattern just after the luminance is changed is 8, momentary flickering may be recognized at the point of time when the emission cycle is changed.

According to the display device and the driving method thereof according to another embodiment of the disclosure, when the luminance level is changed, the light emission cycle is gradually changed from the initial light emission cycle to the target light emission cycle through a transition period including at least one frame period. Accordingly, momentary flickering due to the rapid change in the emission cycle may be alleviated.

Figure 12:
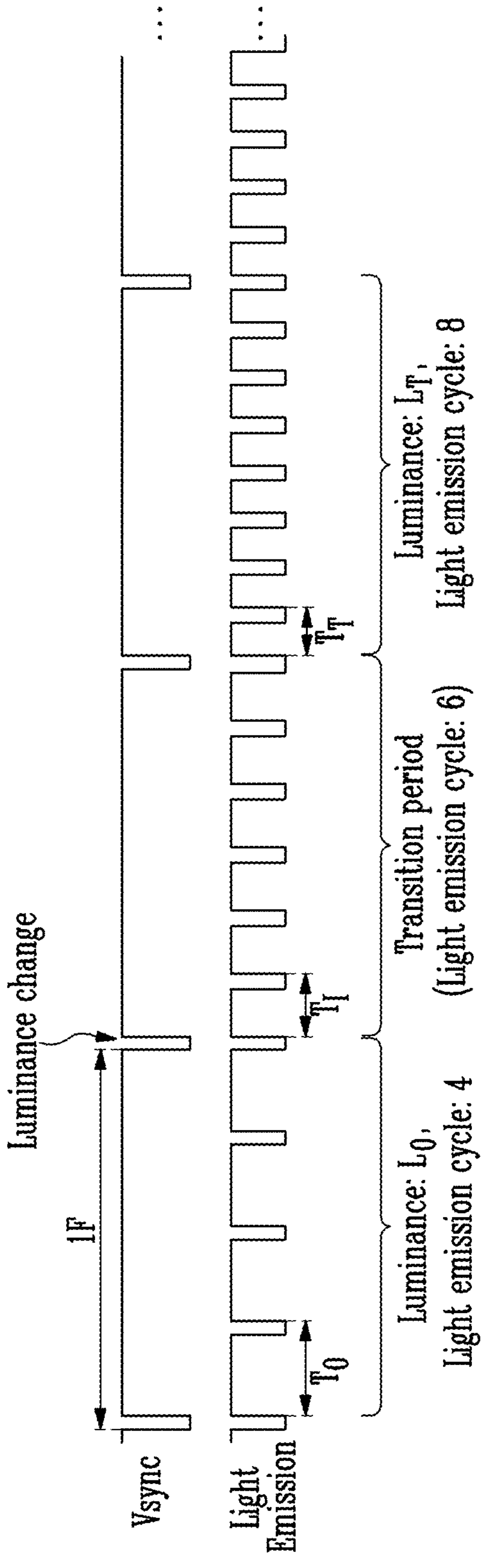
FIG. 12 illustrates a timing diagram of an operation of a display device for changing a luminance level according to another embodiment of the disclosure.

FIG. 12 illustrates a timing diagram of an operation of a display device for changing a luminance level according to another embodiment of the disclosure.

Referring to FIG. 12, during the first frame period 1F, the display device 10 operates to correspond to the initial luminance level $L_0$. That is, the light emission duty ratio of the display panel during the first frame period 1F may be a value corresponding to the initial luminance level $L_0$. In addition, the light emission pattern of the display panel during the first frame period 1F may include four light emission cycles according to the initial period $T_0$.

Immediately after the first frame period 1F, the luminance level of the display device 10 may be changed. That is, immediately after the first frame period 1F, the timing controller 500 may receive a luminance control signal DBV that controls the luminance level to be changed to the target luminance $L_T$. The light emission cycle corresponding to the target luminance $L_T$ may be 8.

In FIG. 12, the light emission cycle may be gradually changed from the initial light emission cycle to the target light emission cycle through the transition period when the luminance is changed. In FIG. 12, the transition period may correspond to one frame period 1F. That is, during one frame period 1F from the time of the luminance change, an image can be displayed with a light emission cycle corresponding to a value between the initial light emission cycle of 4 and the target light emission cycle of 8.

In an embodiment, for example, as shown in FIG. 12, the light emission pattern of light generated by the display panel during the second frame period 1F corresponding to the transition period may have six light emission cycles, and may have a transition light emission period $T_l$ corresponding thereto.

In an embodiment, the duty ratio of the light emission pattern during the transition period may be a value corresponding to the target luminance $L_T$. That is, the luminance level during the transition period becomes the target luminance $L_T$.

In another embodiment, the duty ratio of the light emission pattern during the transition period may be a value corresponding to the initial luminance $L_0$ set to effectively prevent the flickering of the screen from being visually recognized. That is, the luminance level during the transition period may be maintained at the initial luminance $L_0$.

In another embodiment, to minimize the recognized flickering of the screen, the duty ratio of the light emission pattern during the transition period may be a value between the initial luminance $L_0$ and the target luminance $L_T$. That is, when the target luminance $L_T$ is lower than the initial luminance $L_0$, the luminance level during the transition period may be lower than the initial luminance $L_0$ and higher than the target luminance $L_T$. In an embodiment, for example, the luminance level during the transition period may have a value of "$(L_0+L_T)/2$".

Thereafter, from the third frame period, the light emitting element of the display panel may generate light based on the light emission pattern having a light emission cycle of 8, which is the target light emission cycle. Accordingly, the period of the light emission pattern is also changed from the transition light emission period $T_l$ to the target period $T_T$.

Referring to FIG. 12, when the luminance level of the display device is changed, the light emission cycle is not directly changed from 4 to 8, but is changed from 4 to 6 and then from 6 to 8 through the transition period. That is, since the light emission cycle is gradually changed from the initial light emission cycle to the target light emission cycle, the momentary flickering due to the rapid change in the light emission cycle may be alleviated.

Referring back to FIG. 5, in such an embodiment, the light emission signal determination portion 530 may generate information INF to gradually change the light emission cycle during the transition period and transmit it to the control signal generation portion 550.

In an embodiment, as shown in FIG. 12, the transition period may include (or correspond to) one frame period 1F. However, the disclosure is not limited thereto, and the transition period may include a plurality of frame periods 1F. Hereinafter, an embodiment where the transition period includes a plurality of frame periods 1F will be described with reference to FIG. 13.

Figure 13:
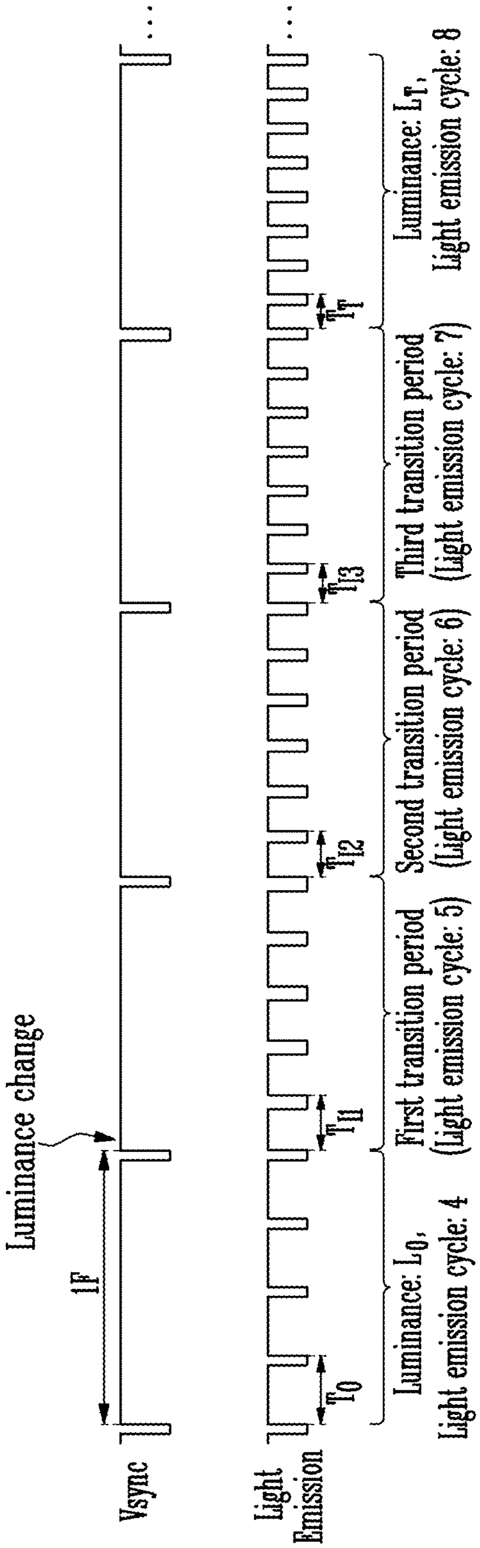
FIG. 13 illustrates a timing diagram of an operation of a display device for changing a luminance level according to another embodiment of the disclosure.

FIG. 13 illustrates a timing diagram of an operation of a display device for changing a luminance level according to another embodiment of the disclosure.

Referring to FIG. 13, during the first frame period 1F, the display device 10 operates to correspond to the initial luminance level $L_0$. That is, the light emission duty ratio of the display panel during the first frame period 1F may be a value corresponding to the initial luminance level $L_0$. In addition, the light emission pattern of the display panel during the first frame period 1F may include four light emission cycles according to the initial period $T_0$.

Immediately after the first frame period 1F, the luminance level of the display device 10 may be changed. That is, immediately after the first frame period 1F, the timing controller 500 may receive a luminance control signal DBV that controls the luminance level to be changed to the target luminance $L_T$. The light emission cycle corresponding to the target luminance $L_T$ may be 8.

In an embodiment as shown in FIG. 13, the light emission cycle may be gradually changed from the initial light emission cycle to the target light emission cycle through the transition period when the luminance is changed. In FIG. 13, the transition period may correspond to three frame periods 1F. Specifically, in an embodiment of FIG. 13, the transition period includes a first transition period, a second transition period, and a third transition period. That is, during three frame periods 1F from the time of the luminance change, an image can be displayed with a light emission cycle corresponding to a value between the initial light emission cycle of 4 and the target light emission cycle of 8.

In an embodiment of FIG. 13, the light emission pattern of light generated by the light emitting element of the display panel during the first transition period may have five light emission cycles, and may have a first transition light emission period $T_l$ corresponding thereto. In addition, the light emission pattern of light generated by the light emitting element of the display panel during the second transition period may have six light emission cycles, and may have a second transition light emission period $T_{l2}$ corresponding thereto. Finally, the light emission pattern of light generated by the light emitting element of the display panel during the third transition period may have seven light emission cycles, and may have a third transition light emission period $T_{l3}$ corresponding thereto.

Thereafter, from the fifth frame period 1F, the light emitting element of the display panel may generate light based on the light emission pattern having a light emission cycle of 8, which is the target light emission cycle. Accordingly, the period of the light emission pattern is also changed from the third transition light emission period Tis to the target period $T_T$.

In an embodiment, the duty ratio of the light emission pattern during the first to third transition periods may be a value corresponding to the target luminance $L_T$. That is, the luminance level during the first to third transition periods becomes the target luminance $L_T$.

In another embodiment, the duty ratio of the light emission pattern during the first to third transition periods may be a value corresponding to the initial luminance $L_0$ set to effectively prevent the flickering of the screen from being visually recognized. That is, the luminance level during the first to third transition periods may be maintained at the initial luminance $L_0$.

In another embodiment, to minimize the recognized flickering of the screen, the duty ratio of the light emission pattern during the first to third transition periods may be a value between the initial luminance $L_0$ and the target luminance $L_T$. That is, the luminance level during the first to third transition periods may be lower than the initial luminance $L_0$ and higher than the target luminance $L_T$. In an embodiment, for example, the luminance level during the first transition period may be lower than the initial luminance $L_0$, the luminance level during the second transition period may be lower than the luminance level during the first transition period, and the luminance level during the third transition period may be lower than the luminance level during the second transition period. In such an embodiment, when the target luminance $L_T$ is lower than the initial luminance $L_0$, the luminance level may gradually decrease during the first to third transition periods. In such an embodiment, when the target luminance $L_T$ is higher than the initial luminance $L_0$, the luminance level may gradually increase during the first to third transition periods.

Referring to FIG. 13, when the luminance level of the display device is changed, the light emission cycle is not directly changed from 4 to 8, but is changed from 4 to 5, 5 to 6, 6 to 7, and 7 to 8 through the conversion period. That is, since the light emission cycle is gradually changed from the initial light emission cycle to the target light emission cycle, the momentary flickering due to the rapid change in the light emission cycle may be substantially alleviated.

Figure 14:
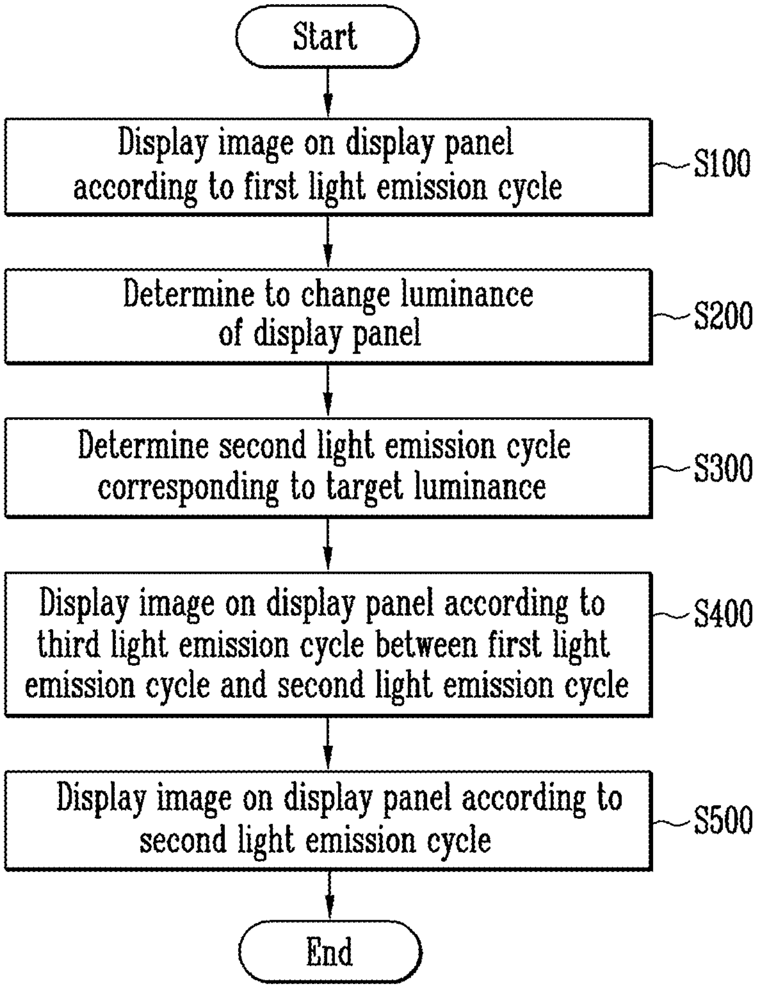
FIG. 14 illustrates a flowchart of an operating method of a display device according to an embodiment of the disclosure.

FIG. 14 illustrates a flowchart of an operating method of a display device according to an embodiment of the disclosure. Referring to FIG. 14, the operating method of the display device according to an embodiment of the disclosure includes displaying an image on a display panel according to (or based on) a first light emission cycle (S100), determining to change luminance of the display panel (or luminance of an image displayed on the display panel) (S200), determining a second light emission cycle corresponding to a target luminance (S300), displaying an image on the display panel according to a third light emission cycle between the first light emission cycle and the second light emission cycle (S400), and displaying an image on the display panel according to the second light emission cycle (S500).

The displaying of the image on the display panel according to the first light emission cycle (S100) may correspond to displaying an image with a corresponding initial light emission cycle based on the initial luminance $L_0$ described above. Thereafter, when the timing controller 500 of the display device 10 receives the luminance control signal DBV for controlling to change the luminance level, it may determine to change the luminance of the display panel (S200). Upon receiving the luminance control signal DBV, the timing controller 500 may determine a duty ratio corresponding to the target luminance and a second light emission cycle corresponding thereto by referring to the lookup table LUT (S300).

During the transition period, the display device 10 may display an image on the display panel according to a third light emission cycle corresponding to a value between the first light emission cycle corresponding to the initial light emission cycle and the second light emission cycle corresponding to the target light emission cycle (S400). After the transition period, the display device may display an image on the display panel according to the second light emission cycle, which is the target light emission cycle (S500). Referring to processes S100, S400, and S500, an image is displayed on the display panel according to the first light emission cycle, the third light emission cycle, and the second light emission cycle, respectively. That is, since the light emission cycle is gradually changed from the initial light emission cycle to the target light emission cycle, the momentary flickering due to the rapid change in the light emission cycle may be substantially alleviated.

Figure 15:
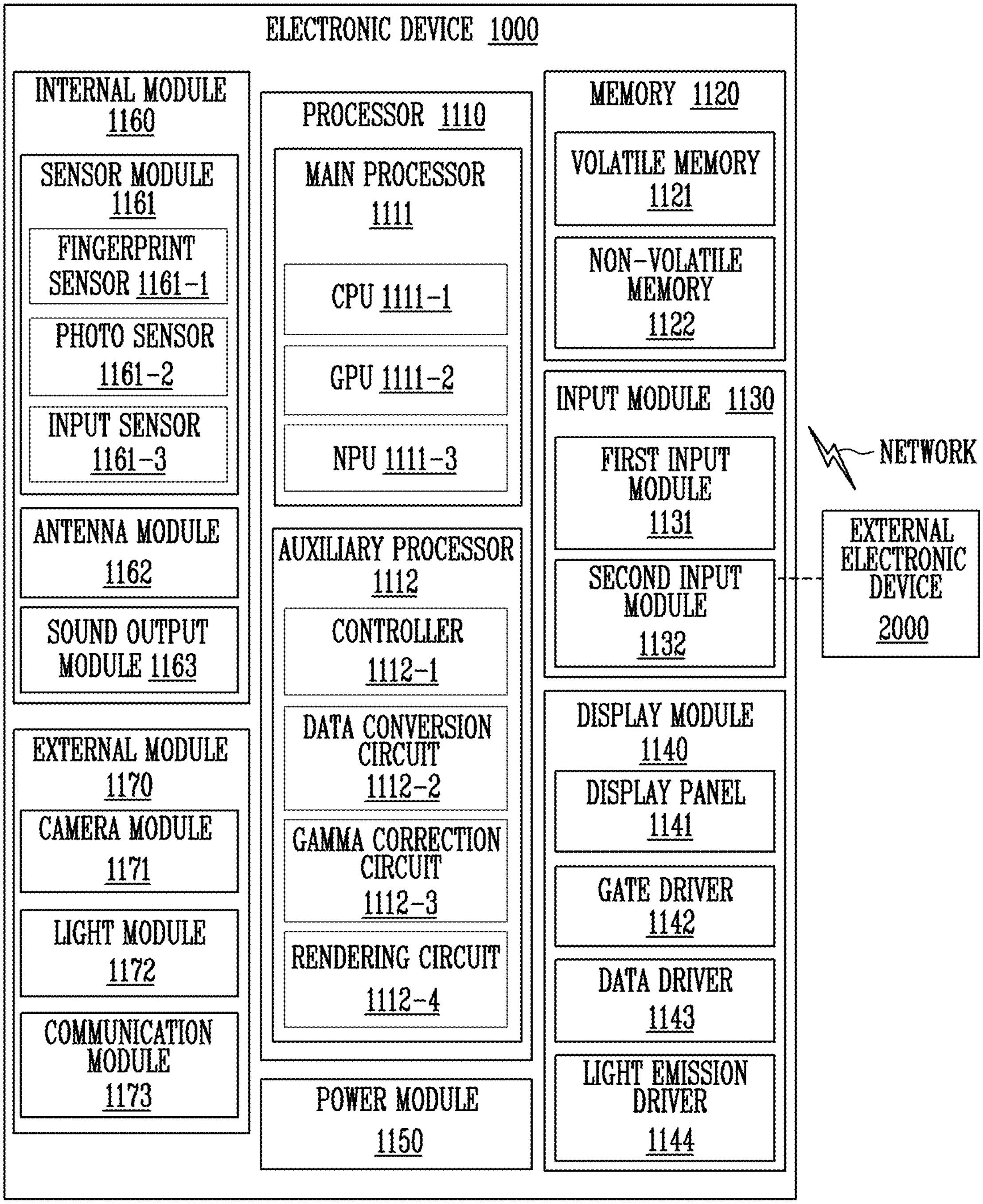
FIG. 15 illustrates an electronic device according to an embodiment of the disclosure.

FIG. 15 illustrates an electronic device according to an embodiment of the disclosure.

Referring to FIG. 15, the electronic device according to an embodiment of the disclosure outputs various information through a display module 1140. The display module 1140 may correspond to at least some of the display device 10 of FIG. 1. When a processor 1110 executes an application stored in a memory 1120, the display module 1140 provides application information to a user through a display panel 1141. The display panel 1141 may be a component corresponding to the pixel portion 100 of FIG. 1.

The processor 1110 obtains external input through an input module 1130 or a sensor module 1161 and executes an application corresponding to the external input. In an embodiment, for example, when the user selects a camera icon displayed on the display panel 1141, the processor 1110 obtains user input through an input sensor 1161-3 and activates the camera module 1171. The processor 1110 transmits image data corresponding to a captured image obtained through the camera module 1171 to the display module 1140. The display module 1140 may display an image corresponding to the captured image through the display panel 1141.

In an embodiment, for example, when personal information authentication is executed in the display module 1140, a fingerprint sensor 1161-1 obtains inputted fingerprint information as input data. The processor 1110 compares the inputted data obtained through the fingerprint sensor 1161-1 with authentication data stored in the memory 1120, and executes an application according to the compared result. The display module 1140 may display information executed according to application logic through the display panel 1141.

In an embodiment, for example, when a music streaming icon displayed on the display module 1140 is selected, the processor 1110 obtains user input through the input sensor 1161-3 and activates a music streaming application stored in the memory 1120. When a music execution instruction is inputted from the music streaming application, the processor 1110 activates a sound output module 1163 to provide sound information corresponding to the music execution instruction to the user.

In the above, the operation of the electronic device 1000 has been briefly described. Hereinafter, a configuration of the electronic device 1000 will be described in detail. Some of components of the electronic device 1000 to be described later may be integrated and provided as one component, and one component thereof may be divided and provided as two or more components.

In an embodiment, the electronic device 1000 may communicate with an external electronic device 2000 through a network (for example, a short range wireless communication network or a long range wireless communication network). According to an embodiment, the electronic device 1000 may include the processor 1110, the memory 1120, an input module 1130, the display module 1140, a power module 1150, an inter (or embedded) module 1160, and an external module 1170. According to an embodiment, in the electronic device 1000, at least one of the aforementioned constituent elements may be omitted, or one or more other constituent elements may be added. According to an embodiment, some (for example, the sensor module 1161, an antenna module 1162, or a sound output module 1163) of the aforementioned constituent elements may be integrated into another constituent element (for example, the display module 1140).

The processor 1110 may execute software to control at least one other constituent element (for example, a hardware or software constituent element) of the electronic device 1000 connected to the processor 1110, and may perform various data processing or calculations. According to an embodiment, as at least some of the data processing or operation, the processor 1110 may store an instruction or data received from other constituent element (for example, the input module 1130, the sensor module 1161, or a communication module 1173) in a volatile memory 1121, may process the instructions or data stored in the volatile memory 1121, and may store the result data in a non-volatile memory 1122.

The processor 1110 may include a main processor 1111 and an auxiliary processor 1112. The auxiliary processor 1112 may correspond to at least some of components of the timing controller 500 of FIG. 1.

The main processor 1111 may include at least one selected from a central processing unit (CPU) 1111-1 and an application processor (AP). The main processor 1111 may further include at least one selected from a graphic processing unit (GPU) 1111-2, a communication processor (CP), and an image signal processor (ISP). The main processor 1111 may further include a neural processing unit (NPU) 1111-3. The neural processing unit is a processor specialized in processing an artificial intelligence model, and the artificial intelligence model may be generated through machine learning. The artificial intelligence model may include a plurality of artificial neural network layers. The artificial neural network may be one of a deep neural network (DNN), a convolutional neural network (CNN), a recurrent neural network (RNN), a restricted boltzmann machine (RBM), a deep belief network (DBN), a bidirectional recurrent deep neural network (BRDNN), a deep Q-network, and a combination of two or more thereof, but is not limited to the above example. The artificial intelligence models may additionally or alternatively include a software structure in addition to the hardware structure thereof. At least two of the aforementioned processing unit and processor may be implemented as an integrated component (for example, a single chip), or each thereof may be implemented as an independent component (for example, a plurality of chips).

The auxiliary processor 1112 may include a controller 1112-1. The controller 1112-1 may include an interface conversion circuit and a timing control circuit. The controller 1112-1 receives an image signal from the main processor 1111, and converts a data format of the image signal to meet an interface specification with the display module 1140 to output image data.

The controller 1112-1 may output various control signals necessary for driving the display module 1140. In an embodiment, for example, the controller 1112-1 may include the mode controller 512, an oscillator controller 513, the oscillator 514, and the start signal controller 516 shown in FIG. 10. The controller 1112-1 may generate the first control signal using the first clock signal when driven in the first mode. In addition, the controller 1112-1 may generate the second control signal using the second clock signal when driven at the second frame frequency in the second mode, and may generate the first control signal using the first clock signal when driven at the first frame frequency in the second mode.

The auxiliary processor 1112 may further include a data conversion circuit 1112-2, a gamma correction circuit 1112-3, a rendering circuit 1112-4, and the like. The data conversion circuit 1112-2 may receive image data from the controller 1112-1, and it may compensate the image data to display the image with a desired luminance according to characteristics of the electronic device 1000 or a user's setting, or convert the image data to reduce power consumption or compensate for an afterimage.

The gamma correction circuit 1112-3 may convert the image data or gamma reference voltage so that the image displayed on the electronic device 1000 has a desired gamma characteristic. The rendering circuit 1112-4 may receive image data from the controller 1112-1 and render the image data in consideration of pixel disposition of the display panel 1141 applied to the electronic device 1000. At least one selected from the data conversion circuit 1112-2 the gamma correction circuit 1112-3 and the rendering circuit 1112-4 may be incorporated into another constituent element (for example, the main processor 1111 or the controller 1112-1). At least one selected from the data conversion circuit 1112-2, the gamma correction circuit 1112-3, and the rendering circuit 1112-4 may be integrated into a source driver 1143 to be described later. The memory 1120 may store various data used by at least one constituent element (for example, the processor 1110 or the sensor module 1161) of the electronic device 1000, and input data or output data for an instruction related thereto. The memory 1120 may include at least one or more of the volatile memory 1121 and the non-volatile memory 1122.

The input module 1130 may receive an instruction or data to be used for a constituent element (for example, the processor 1110, the sensor module 1161, or the sound output module 1163) of the electronic device 1000 from the outside of the electronic device 1000 (for example, a user or the external electronic device 2000).

The input module 1130 may include a first input module 1131 to which an instruction or data is inputted from a user and a second input module 1132 to which an instruction or data is inputted from the external electronic device 2000. The first input module 1131 may include a microphone, a mouse, a keyboard, a key (for example, a button), or a pen (for example, a passive pen or active pen). The second input module 1132 may support a designated protocol that may be connected to the external electronic device 2000 by wire or wirelessly. According to the embodiment, the second input module 1132 may include a high definition multimedia interface (HDMI), a universal serial bus (USB) interface, an SD card interface, or an audio interface. The second input module 1132 may include a connector that may be physically connected to the external electronic device 2000, for example, an HDMI connector, a USB connector, an SD card connector, or an audio connector (for example, a headphone connector).

The display module 1140 visually provides information to the user. The display module 1140 may include a display panel 1141, a gate driver 1142, a source driver 1143, and a light emission driver 1144. The gate driver 1142 may correspond to at least a portion of the scan driver 200 shown in FIG. 1. The source driver 1143 may correspond to at least a portion of the data driver 400 shown in FIG. 1. The light emission driver 1144 may correspond to at least a portion of the light emission driver 300 shown in FIG. 1. The display module 1140 may further include a window, a chassis, and a bracket to protect the display panel 1141.

The display panel 1141 (or a display) may include a liquid crystal display panel, an organic light emitting display panel, or an inorganic light emitting display panel, and the type of display panel 1141 is not particularly limited. The display panel 1141 may be a rigid type, or a flexible type that may be rolled or folded. The display module 1140 may further include a supporter, a bracket, or a heat dissipation member for supporting the display panel 1141.

The gate driver 1142 may be mounted on the display panel 1141 as a driving chip. In addition, the gate driver 1142 may be integrated in the display panel 1141. In an embodiment, for example, the gate driver 1142 includes an amorphous silicon thin film transistor (TFT) gate driver circuit (ASG), a low temperature polycrystalline silicon (LTPS) TFT gate driver circuit, or an oxide semiconductor TFT gate driver circuit (OSG) that is embedded in the display panel 1141. The gate driver 1142 receives the first control signal or the second control signal from the controller 1112-1 and outputs scan signals to the display panel 1141 in response to the first control signal or the second control signal.

The light emission driver 1144 may be mounted on the display panel 1141 as a driving chip. In addition, the light emission driver 1144 may be integrated into the display panel 1141, similar to the gate driver 1142. The light emission driver 1144 outputs a light emission control signal to the display panel 1141 in response to the first control signal and the second control signal received from the controller 1112-1. The light emission driver 1144 may be formed separately from the gate driver 1142, or may be integrated in the gate driver 1142. Additionally, the light emission driver 1144 may generate a light emission control signal in response to a light emission start signal supplied from a start signal controller 516.

The source driver 1143 receives the first control signal or the second control signal from the controller 1112-1, converts image data into an analog voltage (for example, a data signal) in response to the first control signal or the second control signal, and then outputs the data signals to the display panel 1141.

The source driver 1143 may be integrated into other constituent elements (for example, the controller 1112-1). The functions of the interface conversion circuit and the timing control circuit of the controller 1112-1 described above may be integrated into the source driver 1143.

The display module 1140 may further include a voltage generation circuit. The voltage generating circuit may output various voltages required for driving the display panel 1141. In an embodiment, the display panel 1141 may include a plurality of pixel arrays each including a plurality of pixels.

In the embodiment, the source driver 1143 may convert data (for example, output data) corresponding to red (R), green (G), and blue (B) included in the image data received from the processor 1110 into a red data signal (or data voltage), a green data signal, and a blue data signal to provide them to the plurality of pixel arrays included in the display panel 1141 during one horizontal period.

The power module 1150 supplies power to the constituent elements of the electronic device 1000. The power module 1150 may include a battery in which a power voltage is charged. The battery may include a non-rechargeable primary battery, or a rechargeable battery or fuel cell. The power module 1150 may include a power management integrated circuit (PMIC). The PMIC supplies optimized power to each of the above-described modules and modules to be described later. The power module 1150 may include a wireless power transmission/reception member electrically connected to a battery. The wireless power transmission/reception member may include a plurality of antenna radiators in a form of a coil.

The electronic device 1000 may further include an internal module 1160 and an external module 1170. The internal module 1160 may include the sensor module 1161, the antenna module 1162, and the sound output module 1163. The external module 1170 may include a camera module 1171, a light module 1172, and the communication module 1173.

The sensor module 1161 may sense input by a user's body or input by the pen among the first input module 1131, and may generate an electrical signal or a data value corresponding to the input. In addition, the sensor module 1161 may detect an external environment (for example, illuminance, temperature, and the like) and generate an electrical signal or data value corresponding to the external environment.

The sensor module 1161 may include at least one or more of the fingerprint sensor 1161-1, the photo sensor 1161-2, and the input sensor 1161-3. The fingerprint sensor 1161-1 may generate a data value corresponding to a user's fingerprint. The fingerprint sensor 1161-1 may include either an optical type or a capacitive type fingerprint sensor.

The photo sensor 1161-2 (or illuminance sensor) may sense external illuminance and provide an electrical signal or data value corresponding to the sensed illuminance to the auxiliary processor 1112 (or processor 1110). Additionally, the photo sensor 1161-2 may provide a photo sensing signal to the controller 1112-1 at a time when illuminance is sensed. The controller 1112-1 receiving the photo sensing signal may control the number of off periods included in the light emission start signal. In an embodiment, for example, when the photo sensing signal is supplied, the controller 1112-1 may control the light emission start signal to include an off period of a smaller number of light emission control signals in one frame period of the second driving frequency.

The input sensor 1161-3 may generate a data value corresponding to coordinate information of input by the user's body or input by the pen. The input sensor 1161-3 generates an amount of change in capacitance by the input as a data value. The input sensor 1161-3 may sense input by the passive pen, or may transmit/receive data with the active pen.

The input sensor 1161-3 may measure a bio signal such as blood pressure, water, or body fat. In an embodiment, for example, when the user touches a part of the body to the sensor layer or the sensing panel and does not move for a certain period of time, based on a change in an electric field by the part of the body, the input sensor 1161-3 may sense a bio signal and output desired information to the display module 1140.

The sensor module 1161 may further include a digitizer. The digitizer may generate a data value corresponding to coordinate information of a pen input. The digitizer generates the amount of electromagnetic change by the input as a data value. The digitizer may sense input by the passive pen, or may transmit/receive data with the active pen.

At least one of the fingerprint sensor 1161-1, the photo sensor 1161-2, and the input sensor 1161-3 may be implemented as a sensor layer disposed on the display panel 1141 through a continuous process.

At least two selected from the fingerprint sensor 1161-1, the photo sensor 1161-2, and the input sensor 1161-3 may be formed to be integrated into a single sensing panel through a same process. In an embodiment where integrated into one sensing panel, the sensing panel may be disposed between the display panel 1141 and a window disposed at an upper side of the display panel 1141. According to an embodiment, the sensing panel may be disposed on the window, and the position of the sensing panel is not particularly limited.

At least one selected from the fingerprint sensor 1161-1, the photo sensor 1161-2, and the input sensor 1161-3 may be embedded in the display panel 1141. That is, at least one selected from the fingerprint sensor 1161-1, the photo sensor 1161-2, and the input sensor 1161-3 may be simultaneously formed through the process of forming elements (for example, a light emitting element, a transistor, or the like) included in the display panel 1141.

In addition, the sensor module 1161 may generate an electrical signal or a data value corresponding to an internal state or an external state of the electronic device 1000. The sensor module 1161 may further include, for example, a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, or a humidity sensor.

The antenna module 1162 may include one or more antennas for transmitting or receiving a signal or power to or from the outside. According to an embodiment, the communication module 1173 may transmit a signal to an external electronic device or receive a signal from an external electronic device through an antenna suitable for a communication method. An antenna pattern of the antenna module 1162 may be integrated into one component (for example, the display panel 1141) of the display module 1140 or the input sensor 1161-3.

The sound output module 1163 is a device for outputting a sound signal to the outside of the electronic device 1000, and may include, for example, a speaker used for general purposes such as multimedia playback or recording playback, and a receiver used exclusively for receiving calls. According to an embodiment, the receiver may be provided integrally with or separately from the speaker. A sound output pattern of the sound output module 1163 may be integrated into the display module 1140.

The camera module 1171 may capture still images and moving images. According to an embodiment, the camera module 1171 may include one or more lenses, image sensors, or image signal processors. The camera module 1171 may further include an infrared camera capable of measuring the presence or absence of the user, the position of the user, and the gaze of the user.

The light module 1172 may provide light. The light module 1172 may include a light emitting diode or a xenon lamp. The light module 1172 may operate in conjunction with the camera module 1171 or may operate independently.

The communication module 1173 may support establishment of a wired or wireless communication channel between the electronic device 1000 and the external electronic device 2000, and communication through the established communication channel. The communication module 1173 may include one or both of a wireless communication module, such as a cellular communication module, a short range communication module, or a global navigation satellite system (GNSS) communication module and a wired communication module such as a local area network (LAN) communication module or a power line communication module. The communication module 1173 may communicate with the external electronic device 2000 through a short range communication network such as Bluetooth, WiFi direct, or infrared data association (IrDA) or a long range communication network such as a cellular network, the Internet, or a computer network (for example, LAN or WAN). The various types of the communication modules 1173 described above may be implemented as a single chip or may be implemented as separate chips.

The input module 1130, the sensor module 1161, the camera module 1171, and the like may be used to control an operation of the display module 1140 in conjunction with the processor 1110.

The processor 1110 outputs an instruction or data to the display module 1140, the sound output module 1163, the camera module 1171, or the light module 1172 based on input data received from the input module 1130. In an embodiment, for example, the processor 1110 may generate image data in response to input data applied through a mouse or an active pen to output it to the display module 1140, or may generate instruction data in response to the input data to output it to the camera module 1171 or light module 1172. When input data is not received from the input module 1130 for a certain period of time, the processor 1110 may reduce power consumed by the electronic device 1000 by changing an operation mode of the electronic device 1000 to a low power mode or a sleep mode.

The processor 1110 outputs an instruction or data to the display module 1140, the sound output module 1163, the camera module 1171, or the light module 1172 based on sensing data received from the sensor module 1161. In an embodiment, for example, the processor 1110 may compare authentication data applied by the fingerprint sensor 1161-1 with authentication data stored in the memory 1120 and then execute an application based on the compared result. The processor 1110 may execute an instruction based on sensed data sensed by the input sensor 1161-3, or may output corresponding image data to the display module 1140. The processor 1110 may control the luminance of the display panel 1141 in response to the illuminance sensed by the photo sensor 1161-2. When the sensor module 1161 includes a temperature sensor, the processor 1110 may receive temperature data for a measured temperature from the sensor module 1161, and may further perform luminance correction on image data based on the temperature data.

The processor 1110 may receive measurement data about the presence of a user, a user's position, a user's gaze, or the like, from the camera module 1171. The processor 1110 may further perform luminance correction and the like on image data based on the measurement data. In an embodiment, for example, the processor 1110 that determines the presence of a user through an input from the camera module 1171 may output image data whose luminance is corrected through the data conversion circuit 1112-2 or the gamma correction circuit 1112-3 to the display module 1140.

Some of the above constituent elements may be connected to each other through a communication method between peripheral devices, for example, a bus, a general purpose input/output (GPIO), a serial peripheral interface (SPI), a mobile industry processor interface (MIPI), or an ultra path interconnect (UPI) link to exchange a signal (for example, an instruction or data) with each other. The processor 1110 may communicate with the display module 1140 through a mutually agreed interface, for example, may use one of the above-described communication methods, and is not limited to the above-described communication methods.

The electronic device 1000 according to various embodiments disclosed herein may be devices of various types. The electronic device 1000 may include, for example, a portable communication device (for example, a smartphone), a computer device, a portable multimedia device, a portable medical device, a camera, a wearable device, or a home appliance. The electronic device 1000 according to an embodiment of the specification is not limited to the above-described devices.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including pixels connected to light emission control lines;

a light emission driver connected to the display panel through the light emission control lines; and a timing controller which changes a luminance level of the display panel by changing a light emission cycle in response to a luminance control signal received from a host system, wherein the luminance control signal includes information indicating a luminance level of the display panel, and the timing controller controls the light emission driver to display an image in a first light emission cycle when the display panel is driven at a first luminance level, and to display an image in a second light emission cycle when the display panel is driven at a second luminance level different from the first luminance level, wherein the timing controller controls the light emission driver to display an image in a third light emission cycle between the first light emission cycle and the second light emission cycle during a transition period when the luminance level of the display panel is changed from the first luminance level to the second luminance level in response to the luminance control signal, and to display an image in the second light emission cycle after the transition period, wherein the transition period corresponds to a plurality of frame periods, and the third light emission cycle of each of the plurality of frame periods included in the transition period gradually decreases or increases.

2. The display device of claim 1, wherein the timing controller includes:

a light emission signal determination portion which receives the luminance control signal and determines a luminance level and a light emission cycle corresponding to the luminance control signal; and a control signal generation portion which generates a light emission control signal corresponding to the determined luminance level and the determined light emission cycle.

3. The display device of claim 2, wherein the timing controller further includes a storage portion which stores a lookup table including information on a light emission cycle corresponding to each of a plurality of luminance levels, and the light emission signal determination portion determines the luminance level and the light emission cycle based on the lookup table.

4. The display device of claim 1, wherein the luminance level of the display panel is maintained at the first luminance level during the transition period.

5. The display device of claim 1, wherein the luminance level of the display panel is changed to the second luminance level during the transition period.

6. The display device of claim 1, wherein the luminance level of the display panel is changed to a value between the first luminance level and the second luminance level during the transition period.

7. The display device of claim 1, wherein the second light emission cycle is greater than the first light emission cycle, and the third light emission cycle of each of the plurality of frame periods included in the transition period gradually increases.

8. The display device of claim 1, wherein the second luminance level is lower than the first luminance level, and the luminance level of each of the plurality of frame periods included in the transition period gradually decreases.

9. The display device of claim 1, wherein the second light emission cycle is less than the first light emission cycle, and the third light emission cycle of each of the plurality of frame periods included in the transition period gradually decreases.

10. The display device of claim 1, wherein the second luminance level is higher than the first luminance level, and the luminance level of each of the plurality of frame periods included in the transition period gradually increases.

11. An operating method of a display device, the operating method comprising:

displaying an image on a display panel with a first luminance level based on a first light emission cycle corresponding thereto;

determining to change a luminance of the display panel from the first luminance level to a second luminance level in response to a luminance control signal received from a host system, wherein the luminance control signal includes information indicating a luminance level of the display panel;

determining a second light emission cycle corresponding to the second luminance level;

displaying an image on the display panel based on a third light emission cycle between the first light emission cycle and the second light emission cycle during a transition period when it is determined that the luminance level of the display panel is changed from the first luminance level to the second luminance level in response to the luminance control signal; and displaying an image on the display panel based on the second light emission cycle, wherein the transition period corresponds to a plurality of frame periods, and the third light emission cycle of each of the plurality of frame periods included in the transition period gradually decreases or increases.

12. The operating method of the display device of claim 11, wherein the determining the second light emission cycle corresponding to the second luminance level includes determining the second light emission cycle based on a lookup table.

13. The operating method of the display device of claim 11, wherein the displaying the image on the display panel based on the third light emission cycle between the first light emission cycle and the second light emission cycle includes displaying an image on the display panel with the first luminance level.

14. The operating method of the display device of claim 11, wherein the displaying the image on the display panel based on the third light emission cycle between the first light emission cycle and the second light emission cycle includes displaying an image on the display panel with the second luminance level.

15. The operating method of the display device of claim 11, wherein the displaying the image on the display panel based on the third light emission cycle between the first light emission cycle and the second light emission cycle includes displaying an image on the display panel with a third luminance level between the first luminance level and the second luminance level.

16. An electronic device comprising:

a processor which outputs a luminance control signal;

a display panel including pixels connected to light emission control lines;

a light emission driver connected to the display panel through the light emission control lines; and a controller which changes a luminance level of the display panel by changing a light emission cycle in response to a luminance control signal received from the processor, wherein the luminance control signal includes information indicating a luminance level of the display panel, and the controller controls the light emission driver to display an image in a first light emission cycle when the display panel is driven at a first luminance level, and to display an image in a second light emission cycle when the display panel is driven at a second luminance level different from the first luminance level, wherein the controller controls the light emission driver to display an image in a third light emission cycle between the first light emission cycle and the second light emission cycle during a transition period when the luminance level of the display panel is changed from the first luminance level to the second luminance level, and to display an image in the second light emission cycle after the transition period, wherein the transition period corresponds to a plurality of frame periods, and the third light emission cycle of each of the plurality of frame periods included in the transition period gradually decreases or increases.

17. The electronic device of claim 16, wherein the controller includes:

a light emission signal determination portion which receives the luminance control signal and determines a luminance level and a light emission cycle corresponding to the luminance control signal; and a control signal generation portion which generates a light emission control signal corresponding to the determined luminance level and the determined light emission cycle.

18. The electronic device of claim 17, wherein the controller further includes a storage portion which stores a lookup table including information on a light emission cycle corresponding to each of a plurality of luminance levels, and the light emission signal determination portion determines the luminance level and the light emission cycle based on the lookup table.

* * * * *